(12) United States Patent
Vishlitzky et al.

(10) Patent No.: US 6,990,536 B2
(45) Date of Patent: Jan. 24, 2006

(54) METHOD FOR ENABLING OVERLAPPED INPUT/OUTPUT REQUESTS TO A LOGICAL DEVICE FROM MULTIPLE HOSTS WITH EXPLICIT ALLEGIANCES

(75) Inventors: Natan Vishlitzky, Brookline, MA (US); Hana Moreshet, Framingham, MA (US); Martin Farley, Cupertino, CA (US); Izhar Sharon, Framingham, MA (US); Elizabeth C. Patapoutian, Westboro, MA (US)

(73) Assignee: EMC Corporation, Hopkinton, MA (US)

( * ) Notice: Subject to any disclaimer, the term of this patent is extended or adjusted under 35 U.S.C. 154(b) by 112 days.

(21) Appl. No.: 10/692,120

(22) Filed: Oct. 23, 2003

(65) Prior Publication Data

US 2004/0107302 A1  Jun. 3, 2004

Related U.S. Application Data

(63) Continuation of application No. 09/731,513, filed on Dec. 6, 2000, now Pat. No. 6,665,738.

(60) Provisional application No. 60/236,470, filed on Sep. 29, 2000.

(51) Int. Cl.
*G06F 3/00* (2006.01)

(52) U.S. Cl. ........................................ 710/4

(58) Field of Classification Search ............... 710/3–7, 710/9, 15–19, 28, 58, 59, 36, 37, 46–48, 710/200; 711/100, 147, 111–113, 163, 167, 711/168

See application file for complete search history.

(56) References Cited

U.S. PATENT DOCUMENTS

| | | |
|---|---|---|
| 5,285,528 A | 2/1994 | Hart |
| 5,530,897 A | 6/1996 | Meritt |
| 6,167,459 A | 12/2000 | Beardsley et al. |
| 6,170,023 B1 | 1/2001 | Beardsley et al. |
| 6,185,638 B1 | 2/2001 | Beardsley et al. |
| 6,240,467 B1 | 5/2001 | Beardsley et al. |
| 6,453,366 B1 | 9/2002 | Broberg et al. |

*Primary Examiner*—Kim Huynh
*Assistant Examiner*—Joshua Schneider
(74) *Attorney, Agent, or Firm*—George A. Herbster

(57) ABSTRACT

A method for enabling a data processing system with a host running under an operating system and with a disk array storage device organized by logical devices to processes plural I/O requests from one or more host processors concurrently.

24 Claims, 24 Drawing Sheets

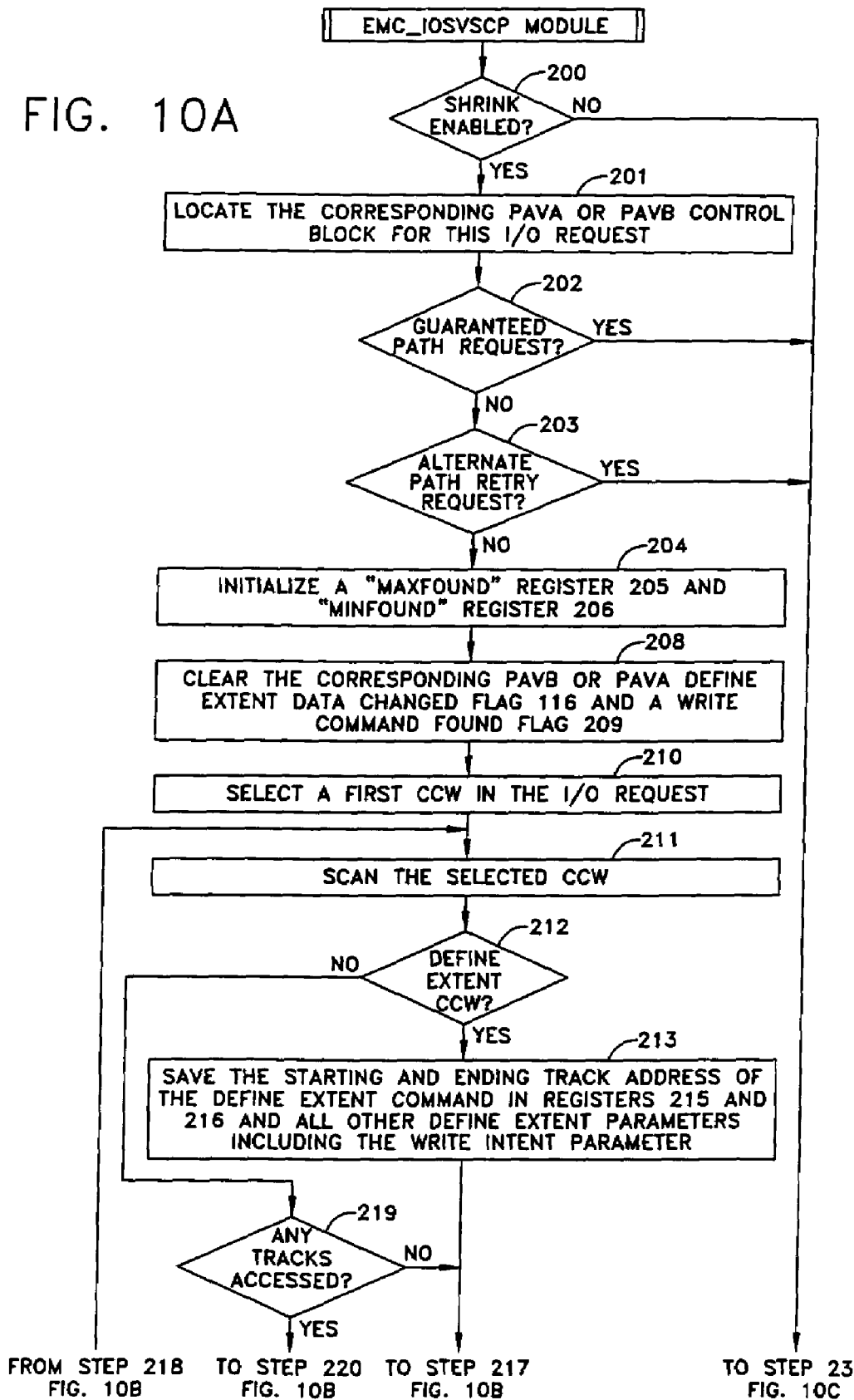

METHOD FOR ENABLING OVERLAPPED INPUT/OUTPUT REQUESTS TO A LOGICAL DEVICE FROM MULTIPLE HOSTS WITH EXPLICIT ALLEGIANCES

CROSS REFERENCE TO RELATED APPLICATION

This application is a continuation of U.S. patent application Ser. No. 09/731,513 filed Dec. 6, 2000 U.S. Pat. No. 6,665,738 entitled Method for Enabling Overlapped Input/Output Requests to a Logical Device From Multiple Hosts With Explicit Allegiances which claims the benefit of Provisional Application No. 60/236,470, filed Sep. 29, 2000.

BACKGROUND OF THE INVENTION

1. Field of the Invention

This invention generally relates to data processing systems including one or more hosts and one or more data storage systems, such as a disk array, or direct access, storage device, with multiple physical disk drives and more specifically to a method and apparatus for enabling multiple hosts to issue optimized overlapping input-output, or I/O, requests to a particular logical device in the data storage system.

2. Description of Related Art

As the capabilities of data processing systems have increased, applications for use in those data processing systems have become more sophisticated. Now a data processing system may contain multiple hosts operating with independent host applications that access data in a large capacity data storage system either directly or over a network. Today, data storage systems are generally divided into logical devices or into blocks called by other names, such as logical volumes, data sets, files, etc. It is highly desirable that a data storage system in which a single logical device, that may store multiple files, be enabled to handle multiple concurrent requests for access to different files even from one or more different hosts and host applications.

A conventional data processing system includes a main frame computer or host including multiple central processors that interact with a data storage system. The data storage system generally includes a "disk array storage device," or "direct access storage device" (e.g., a "DASD") in which multiple physical disk drives are organized in multiple logical devices. The host communicates with the DASD through I/O requests provided by the operating system associated with the host. The host operating system heretofore has generally limited accesses to a given logical device to a single access at a time. For example, in the known MVS operating system, one unit control block (UCB) is assigned to each logical device. When a first I/O request identifies a file or dataset in a logical device, a UCB assigned to that logical device is set to a busy state until the entire I/O request is completed. Any following requests for the same logical device generated during the interval of the first request were queued to await the availability of that one UCB even though the I/O request was to a different file or dataset. Consequently, this feature forced all the I/O requests to a single logical device to be handled in seriatim.

There are some applications in which such an I/O request serialization may not adversely effect all operations. For example, in data storage systems that incorporate cache memory with the physical disk drives write operations merely transfer data to the cache memory. Read operations that identify data within the cache memory are handled in a minimal time so there is a minimal delay until a next read or write operation can be started. If it could be assured that all such requests could be handled in the cache memory, serialization would impose a minimal penalty. However, in most applications data will be required that is not in the cache memory, so access to a physical disk drive for the data will be necessary. The resulting interval for transferring data from the physical disk drive to the cache memory is significantly longer than the time to transfer data between the host and the cache memory. Consequently, other write and read requests, that might otherwise access data already in the cache, are delayed until the read miss operation has been completed. In these situations serialization adversely affects host processing significantly.

In accordance with one new approach an operating system that normally uses one unit control block, or UCB, defines that UCB as a "base UCB". A number of unassigned UCB's are allocated to the same logical device. These are known as alias UCB's. In accordance with this approach a host can issue concurrent or overlapped I/O requests by assigning each different request to one of the base or alias UCB's up to the total number of UCB's allocated to the logical device. What is needed is a disk array storage device that can handle such overlapped I/O requests.

SUMMARY

Therefore it is an object of this invention to provide a method and apparatus for enabling multiple concurrent accesses to a single logical device in a data storage system.

Another object of this invention is to provide the capability of accessing the same logical device in a data storage system from multiple hosts with explicit allegiances.

Still another object of this invention is to provide the capability of accessing the same logical device in a data storage system from multiple hosts with explicit allegiances where the requests for access are overlapped.

Yet still another object of this invention is to provide the ability to direct multiple I/O requests from multiple hosts with explicit allegiances in combination with the capability of accommodating multiple concurrent or overlapped I/O requests.

In accordance with this invention, a disk array storage facility is enabled to handle overlapped input-output requests to a single logical volume. An input-output request contains a plurality of predetermined parameters including an address range and the storage facility includes an overlap polling queue. The disk array storage facility establishes a table for the logical volume with at least one entry for input-output requests and their corresponding parameters including the address range. The parameters in each new entry are tested respect to the parameters for input-output request entries in the table including the comparing of the address range in the new input-put request with the address range of each input-output request in the table to determine whether to place the new input-output request on the overlap polling queue. In response to the testing, one of a plurality of control functions is performed. One control function enables the processing of the input-output request by the storage facility and the polling of entries on the overlap polling queue.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIGS. 10A through 10C constitute a flow diagram that depicts a method for optimizing accesses to a logical device;

DESCRIPTION OF ILLUSTRATIVE EMBODIMENTS

Figure 1:
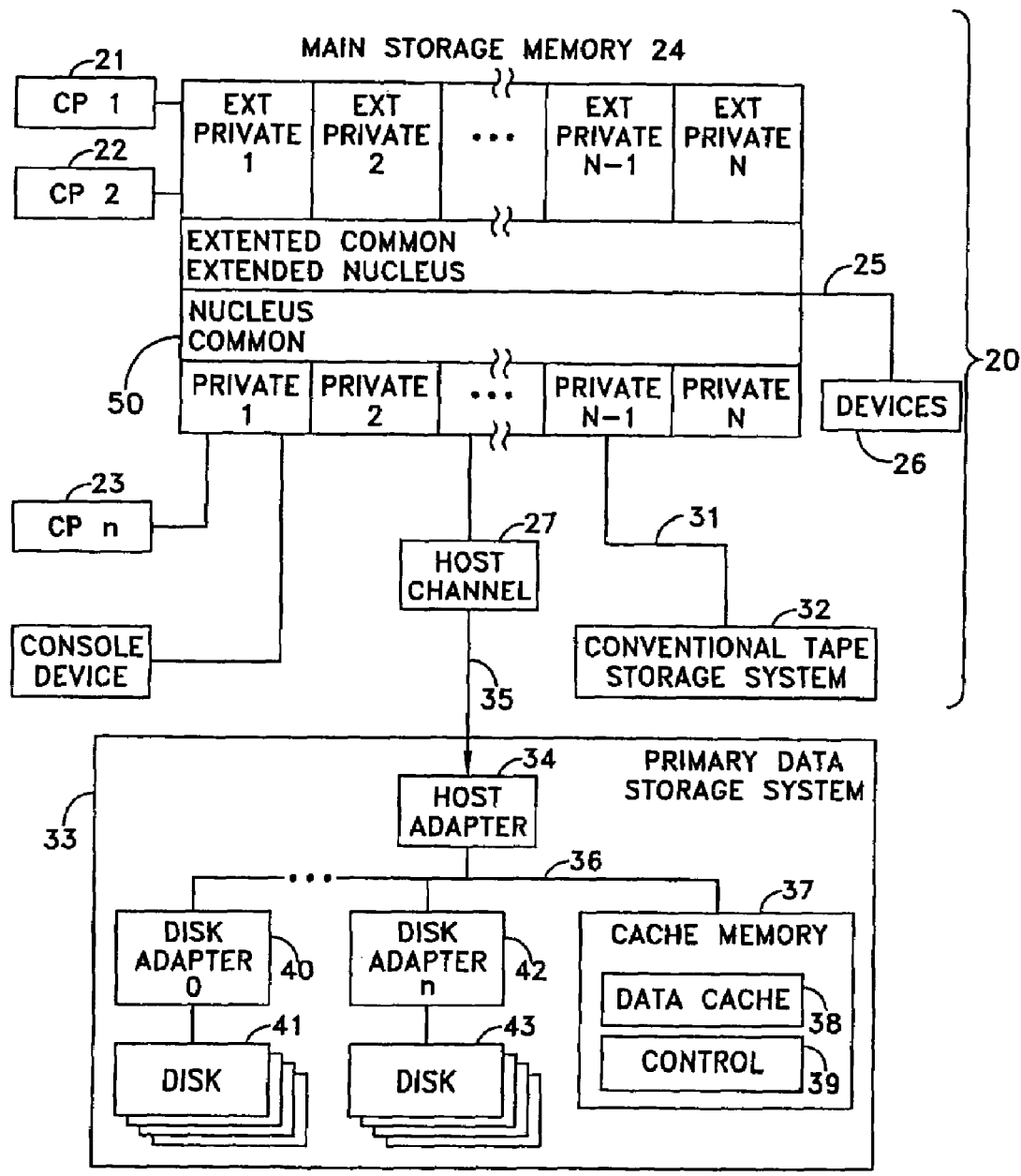
FIG. 1 is a block diagram of a data processing system adapted for using this invention.

FIG. 1 depicts a data processing system 20 which, for purposes of explaining this invention, is shown as an IBM based system with an IBM MVS operating system. The data processing system 20 comprises multiple central processors (CP) identified as CP1 21, CP2 22 and CPn 23 where n is the maximum number of central processors that comprise a portion of a data processing system, or host system, 20. Each central processor connects to a main storage memory 24. In an MVS environment the main storage memory 24 comprises a number of sections including, as known, private, common, nucleus, extended nucleus, extended common and extended private storage areas.

A multiplexor or like channel 25 provides a communications path for devices 26 such as printers, local terminals and the like. Another channel 31 establishes a communications path with a conventional tape storage system 32. Such systems and their operations, including the methods by which data is exchanged, are known in the art.

This invention is directed to such a data processing system 20 that, in one embodiment, includes a primary data storage system 33 with a magnetic disk array storage device (DASD). This storage device comprises conventional, unmodified magnetic disk storage devices, such as described in U.S. Pat. No. 5,206,939 of Moshe Yanai et al. for a System and Method for Disk Mapping and Data Retrieval, assigned to the same assignee as this invention and such as is available as a Symmetrix integrated cache disk array.

The basic components of such a disk array storage device include a channel or host adapter 34 that connects to a channel 35 from a host channel 27 associated with the host system 20. A bus 36 connects the channel or host adapter 34 to a cache memory 37. The cache memory 37 includes a data cache 38 and a control 39. A disk adapter 40 connects to the bus 36 and to a plurality of disks 41; another disk adapter 42, to a plurality of disks 43.

A single physical integrated cache-disk array as a primary data storage system 33, such as shown in FIG. 1, comprises a plurality of physical disk drives or disks that are organized into one or more logical volumes. In the context of one specific embodiment, each logical volume in the primary data storage system 33 constitutes a "device". A given logical device may occupy a portion or portions of one or more physical disk drives or may occupy one or more complete physical disk drives.

In the Symmetrix integrated cache-disk array, writing operations transfer data into the data cache 38. Programs in the control 39 subsequently transfer or destage the data from the data cache 38 to a logical device on one of the pluralities of disks 41 and 43. Reading operations are accomplished by first determining whether the requested data is available in the data cache 38. If it is, the reading operation is designated as a "read-hit" operation and there is no need to access a physical disk drive. If the data is not in the data cache 38, the reading operation is designated as a "read-miss" operation and the requested information must transfer from a logical device on one of the plurality of disks 41 and 43 to the data cache 38 for subsequent transfer to the main storage memory 24.

Figure 2:
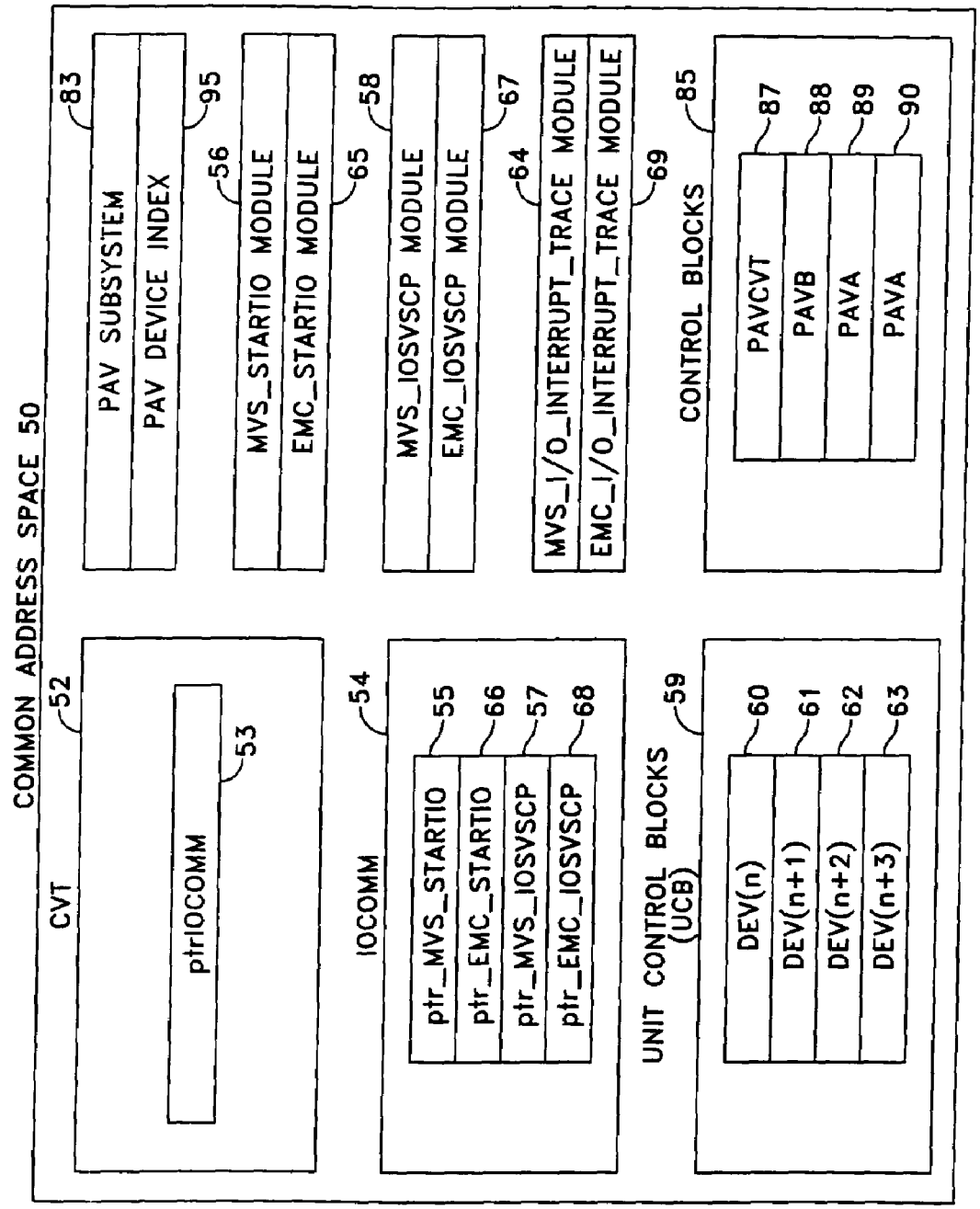
FIG. 2 is a block diagram that depicts the organization of certain address space in the data processing system of FIG. 1.

For purposes of understanding this invention, it is assumed that the main storage memory 24 in the host will contain a user program or application in private or other address space and an application for implementing this invention in other common address space 50 shown in FIG. 2 that depicts particular portions of common address space 50 in the main storage memory 24 of FIG. 1. Within the common address space 50 the MVS operating system conventionally includes a communications vector table (CVT) 52 with a ptrIOCOMM pointer 53 that defines a starting address of an IOCOMM table 54. The IOCOMM table 54 normally contains a ptr_MVS_STARTIO pointer 55 that identifies the location of an MVS_STARTIO module 56. The prefixes "MVS_" and "EMC_" distinguish a conventional module provided in MVS from a corresponding module provided in accordance with this invention and designated by the prefix "EMC_". For example, there is an EMC_STARTIO module described later that operates as a precursor to the MVS_STARTIO module 56.

The IOCOMM table 54 also contains a ptr_MVS_IOSVSCP pointer 57 that identifies the location of an MVS_IOSVSCP module 58 that, as known, is an interface with the hardware to start a sub-channel sequence by which channel command words are sent in sequence to the primary data storage system 33. Typically this MVS_IOSVSCP module 58 adds a Define Extent channel command word to the beginning of a string of channel command words that are generated in response to a host I/O request.

The common area additionally includes unit control blocks (UCB) 59 that define various resources in the system. FIG. 2 depicts DEV(n), DEV(n+1), DEV(n+2) and DEV (n+3) unit control blocks 60 through 63 that are important to an understanding of this invention and that are assigned to different devices, particularly logical volumes in the primary data storage system 33 of FIG. 1. These specific UCB's are associated with logical devices "n", "n+1", "n+2" and "n+3" in the primary data storage system 33.

In normal MVS operations if an I/O request identifies a resource, such as a logical device "n" in the primary data storage system 33, the user program initiates a transfer by means of the ptrIOCOMM pointer 53. The MVS system identifies an appropriate one of the unit control blocks 59, such as the DEV(n) UCB 60, and transfers control to the MVS_STARTIO module 56 identified by the ptr_MVS_STARTIO pointer 55. The MVS_STARTIO module 56 uses the ptr_MVS_IOSVSCP pointer 57 to call the MVS_IOSVSCP module 58 to generate the channel command words necessary to limit the I/O request which typically consists of a Define Extent CCW.

More specifically, the MVS_STARTIO module 56 builds a request to be placed on a queue. This request includes an input-output supervisor block (IOSB) that includes an IOSUCB field with a pointer to the corresponding UCB. If a request identifies a device "n", the IOSUCB field points to the DEV(n) UCB 60 in FIG. 2. When this and other information is complete, the MVS_STARTIO module 56 responds to the request and then calls the MVS_IOSVSCP module 58 to effect the actual transfer.

When the I/O operation is complete, the MVS system posts status information that indicates the success of the operation. An MVS_I/O_INTERRUPT_TRACE module 64 responds to trace the I/O Interrupt. If any error condition exists, sense data will also be transferred to identify the nature of the error. If the operation involves a data transfer, a user application program identifies a user I/O buffer as the storage location to which or from which data should be transferred.

All the foregoing procedures are conventional MVS operating procedures that are well known in the art. In accordance with this invention, an operating system, such as an MVS operating system can be adapted to provide the advantages of parallel access by adding certain features of this invention to the conventional operating system and by modifying the process by which the primary data storage system 33 handles commands received from a host control processor. Further it has been found that these modifications enable three additional features to be realized. It is possible to reduce the size of a defined extent to a required extent that represents the actual extent of tracks that I/O requests in a command chain will use. It is also possible to eliminate write serialization from I/O requests that are actually read-only. It is further possible to accommodate requests from different host processors to a single logical device. These four features, individually and in different combinations, can improve the rate at which data transfers occur between the host processors and a logical device.

The Host Parallel Access Application

Looking first at the parallel access features, when a conventional magnetic disk storage device is to be adapted for enabling parallel or overlapped accesses to the same device or logical volume, a PAV (Parallel Access to Volume) application is loaded into the common address space to establish an appropriate environment. In a specific implementation of this invention, the common address space 50 of FIG. 2 includes the EMC_STARTIO module 65 used with the ptr_EMC_STARTIO pointer 66 in the IOCOMM table 54. Additionally the common address space includes an EMC_IOSVSCP module 67 with a ptr_EMC_IOSVSCP pointer 68 and an EMC_I/O_INTERRUPT TRACE module 69 that are described later.

Figure 3:
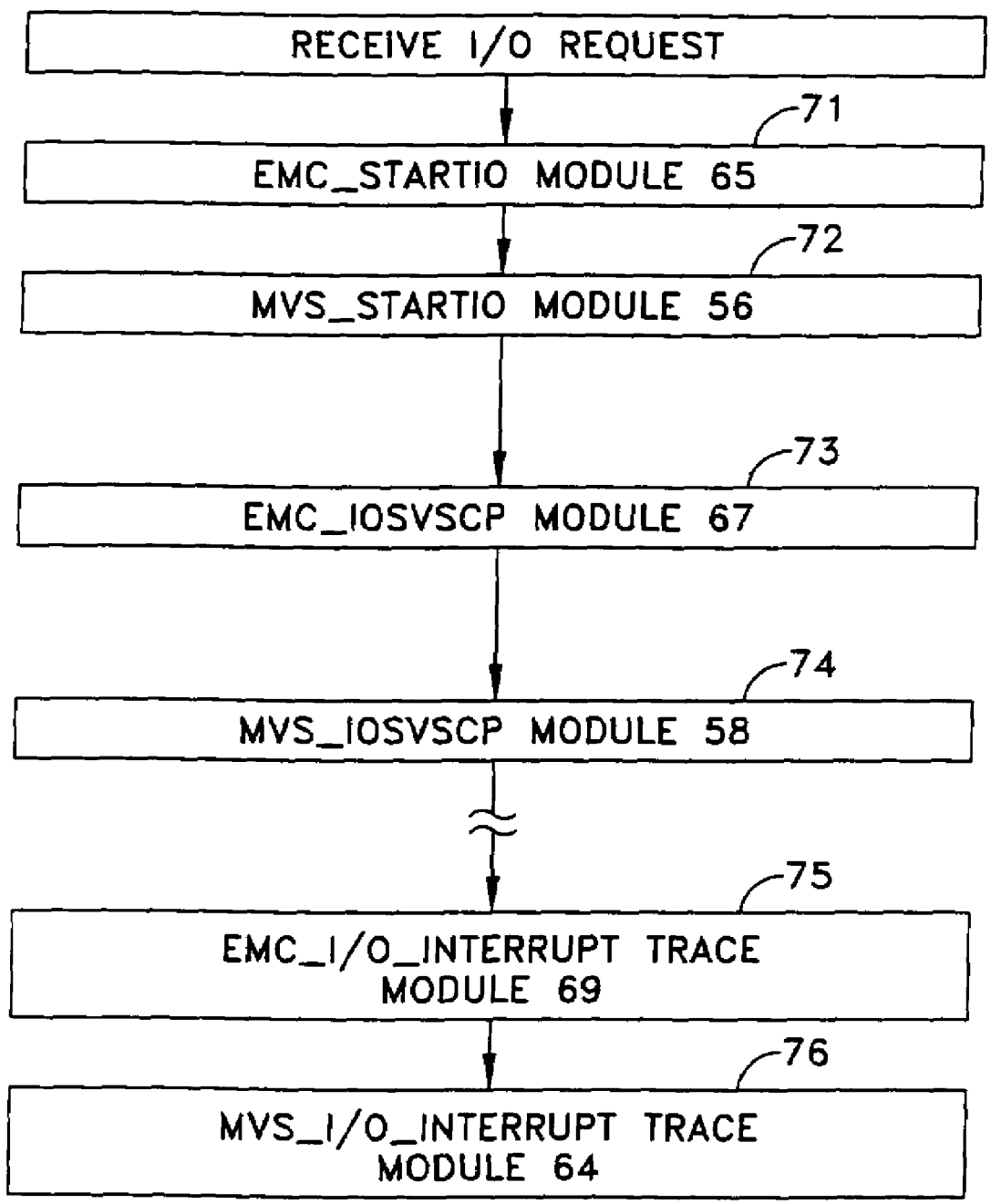
FIG. 3 is a block diagram that shows the general interaction between this invention and components of a conventional operating system.

FIG. 3 depicts the general flow of the operation of this invention within the host system 20 and the interaction between the modules in the common address space that implement this invention and standard operating system modules. Essentially step 71 represents the receipt of an I/O request from an application. Just before the MVS_STARTIO module 56 would normally operate, step 71 enables EMC_STARTIO module 65 to perform the necessary operations to identify an appropriate unit control block UCB. When this is complete, control transfers to step 72 whereby the MVS_STARTIO module 56 takes over the further processing of the I/O request. As part of that process, the MVS_STARTIO module 56 typically invokes the MVS_IOSVSCP module 58. In accordance with this invention, the EMC_IOSVSCP module 67 is processed in step 73 as a precursor to the operation of the MVS_IOSVSCP module 58 in step 74. The EMC_IOSVSCP module 67 operates to optimize the I/O request by defining a required extent that may be smaller than the defined extent for the I/O request. In accordance with another aspect of this invention, it also determines if the I/O request will initiate a write operation. Each of these features, taken singly or in any combination, can improve parallel access processing and/or the response of primary data storage system 33 to multiple requests from different host processors to the same logical device.

After the MVS_IOSVSCP module 58 executes a start subchannel instruction, there is a wait, represented by a broken line after step 74 until an interrupt is received. Normally the MVS_I/O INTERRUPT_TRACE module 64 receives that interrupt. However, in this case an EMC_I/O_INTERRUPT_TRACE module 69 is activated at step 75 as a precursor to the operation of the MVS_I/O_INTERRUPT_TRACE module 64 completing its normal operations in step 76.

The EMC_STARTIO module 65 provides all the functions for incorporating the parallel access to volume application. Generally speaking a host parallel access application associates a chain of control blocks, called "alias unit control blocks" or "alias UCB's" to a conventional unit control block, or "base UCB", for the device. Given the range of available device numbers and the usual number of devices, generally there will always be a list of unused or available device numbers. An individual device number from this list is assigned as an individual device number for an alias UCB. In response to each I/O request, the PAV application finds an available one of the base or related alias UCB's for use in initiating a request to the primary data storage system 33. Consequently, multiple I/O request processes can be directed to the primary data storage system 33 at the same time, so that the I/O request processes at the primary data storage system 33 are overlapped.

Figure 4:
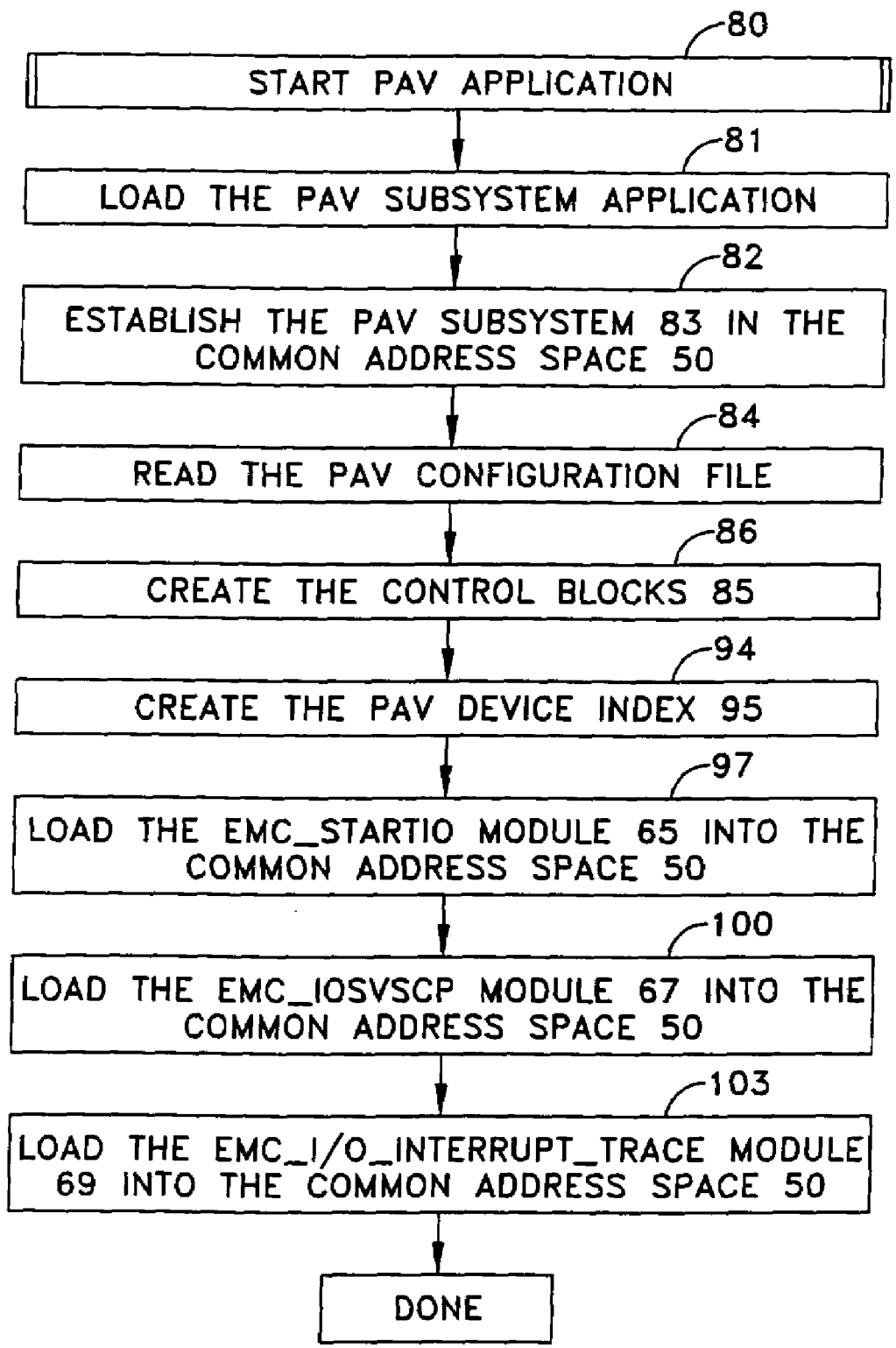
FIG. 4 is a flow diagram of a process for initiating multiple concurrent or overlapped access capabilities for the data processing system of FIG. 1.

FIG. 4 depicts the process by which the PAV application begins. It is assumed that a system administrator has identified unit control blocks that are available as UCB's. Step 80 starts the process of this invention by reading a job to load various parameters into a configuration file and establish a relationship between each base UCB and one or more alias UCB's. For example, in a system where the operation were conducted as a JCL job, the following statements could be included to define portions of the configuration file:
SHRINK=YES
ADD BASE=C06C
ALIAS=C078
ALIAS=C079
*
ADD BASE=C06D
ALIAS=C07A
ALIAS=C07B
*
ADD BASE=C06E
ALIAS=C072
ALIAS=C073

Alternatively, the identification of the relationships could be predefined and ascertained by examining data obtained from the primary data storage system 33 to obtain the same relationship. In whatever manner, as an example, consider a configuration in which base UCB's are associated with device numbers C06C, C06D AND C06E. Each refers to a different logical device. The configuration file also indicates that each device and its base UCB will be provided with two alias UCB's. Specifically, this application associates alias UCB's C078 and C079 with base UCB C06C; alias UCB's C07A and C07B with base UCB CO6D; and alias UCB's C072 and C073 with base UCB C06E, respectively. Prior to the description of base UCB's and their associated alias UCB's, this job contains a statement SHRINK=YES. This parameter will be used to optimize the processing of the I/O request as described later.

Step 81 loads the parallel access volume (PAV) subsystem application and step 82 moves the application into a block 83 in the common address space 50 of FIG. 2. Then step 84 reads the PAV configuration file to obtain information that is useful in establishing the required base and alias UCB and various control blocks 85.

Figure 5:
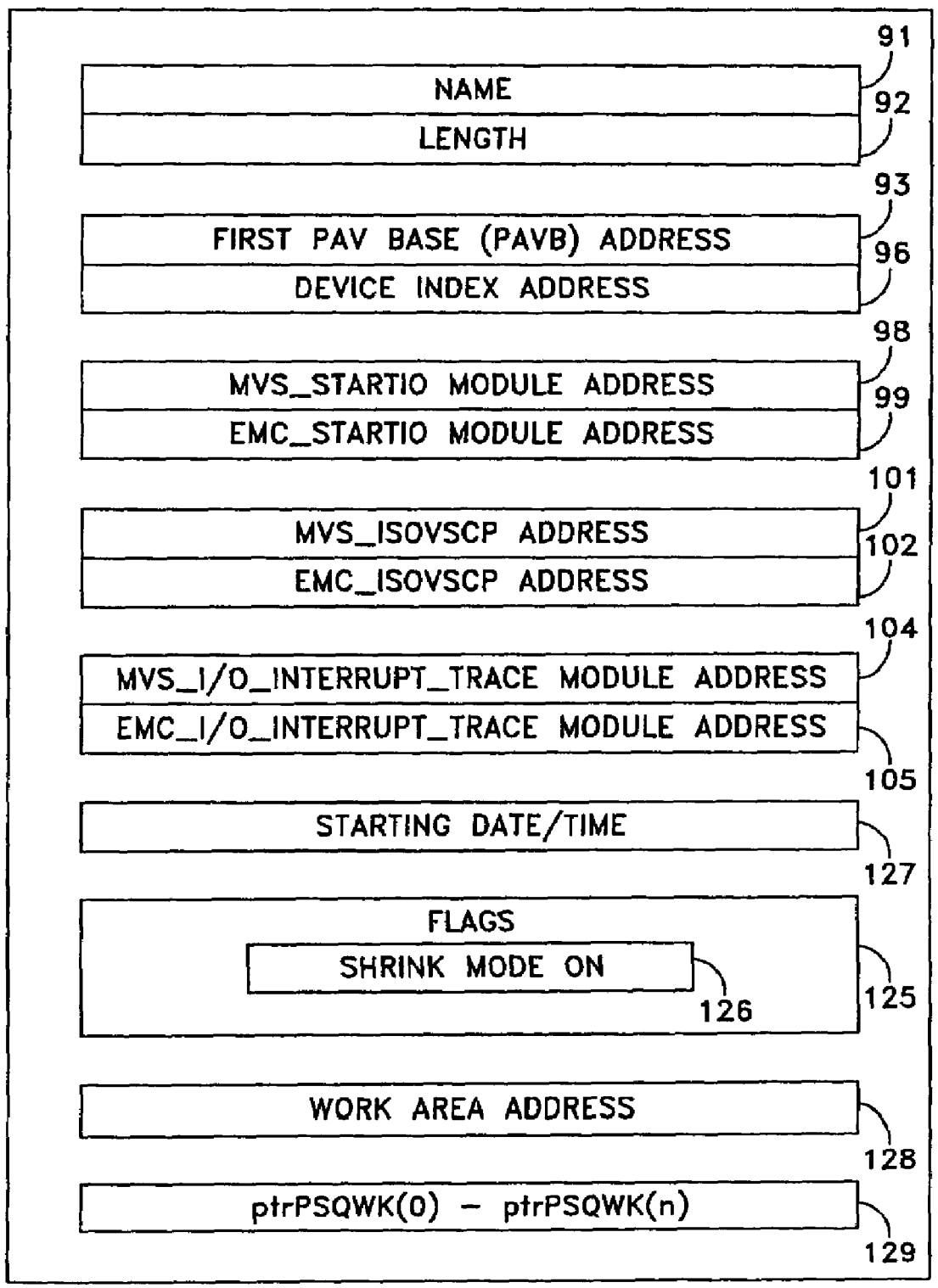
FIGS. 5 through 7 are block diagrams that depict the organization of various control blocks that are useful in understanding the operation of the program in FIG. 4.
Figures 6, 7:
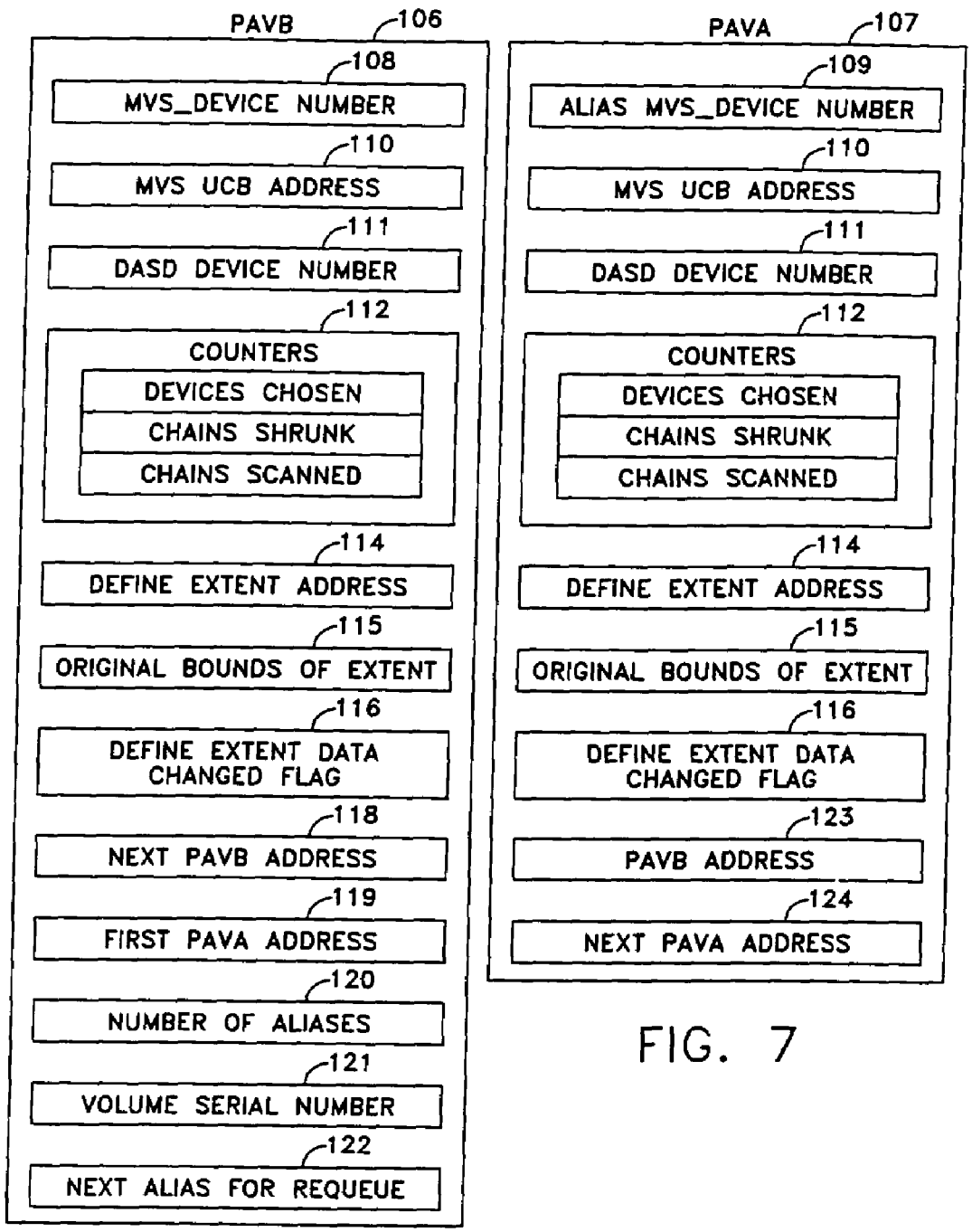

Step 86 creates the control blocks 85 including a PAVCVT control block 87 shown in FIG. 2. This is a primary control block from which any other control block in the PAV subsystem 83 can be reached. More specifically, step 86 in FIG. 4 creates the PAVCVT control block 87 with a structure as shown in FIG. 5. It also creates PAVB and PAVA control blocks having structures as shown in FIGS. 6 and 7. For the specific configuration file listed above, step 86 creates, for the first logical device, one PAVB control block 88 for the base device C06C and two PAVA control blocks 89 and 90. It also creates one PAVB and two PAVA control blocks for the base device C06D and one PAVB and two PAVA control blocks for base device C06E. These have the same structure. They are imbedded in the control blocks 85, but are not shown.

Referring specifically to FIG. 5, the PAVCVT control block 87 includes its name at location 91 and its length at location 92 in accordance with conventional MVS operating system practices. A block 93 includes the first PAV base address, which is the address to the first PAVB control block 88 corresponding to the UCB associated with device C06C.

Step 94 in FIG. 4 creates a PAV device index 95 shown in FIG. 2 that provides a means for converting a device identification in an MVS operating system context to an identification of a specific one of the PAVA and PAVB control blocks. Location 96 in FIG. 5 receives a pointer to the PAV device index 95 in FIG. 2.

Step 97 in FIG. 4 loads the EMC_STARTIO module 65 into the common address space 50. As previously stated, the EMC_STARTIO module 65 operates before the MVS_STARTIO module 56. Step 97 also loads the ptr_MVS_STARTIO pointer 55 and the ptr_EMC_STARTIO pointer 66 into locations 98 and 99 in FIG. 5, respectively. Step 100 in FIG. 4 loads an EMC_IOSVSCP module 67 into the common address space 50 and the ptr_MVS_IOSVSCP pointer 57 and the ptr_EMC_IOSVSCP pointer 68 into locations 101 and 102, respectively. Similarly, step 103 loads the EMC_I/O_INTERRUPT_TRACE module 69 into the common space 50 of FIG. 2 to be used before the MVS_I/O_INTERRUPT_TRACE module 64. Step 103 additionally loads pointers to the MVS_I/O_INTERRUPT_TRACE module 64 and an EMC_I/O_INTERRUPT_TRACE module 69 into locations 104 and 105, respectively. This completes the process by which the PAV application is readied to respond to I/O requests in accordance with this invention.

Step 86 in FIG. 4 creates the PAVB and PAVA control blocks with the specific data structure for each as shown by representative blocks 106 and 107 in FIGS. 6 and 7. As many registers and other control blocks have a similar structure and function, like reference numerals identify like components in each of FIGS. 6 and 7.

As previously indicated, each logical volume or device identified in an I/O request has an MVS device number, commonly referred to as a CUU. That number is inserted in a MVS_DEVICE number block 108 in FIG. 6 and in an analogous alias MVS_DEVICE number block 109 in each PAVA control block. Locations 110 include the MVS UCB address. This is the address of the unit control block. Locations 111 store the device number for the logical volume within the primary data storage system 33.

In addition, each of the PAVA and PAVB control blocks includes a set 112 of counters that can provide useful statistics by which to judge the effectiveness of the PAV and optimization methods of this invention. These sets include counters for (1) the number of times a device is chosen, (2) the number of chains shrunk and (3) the number of chains scanned. They are not necessary for the operation of any aspect of this invention and are shown merely for completing the description of the control blocks in FIGS. 6 and 7.

Locations 114 contain a define extent address, and locations 115, the original boundaries of a defined extent, namely, the lower and upper tracks to be accessed by an I/O request in the logical device. In disk array storage devices as available from the assignee of this invention, those bounds are defined in terms of a cylinder and head address. Locations 114 and 115, along with a DEFINE EXTENT DATA CHANGED flag 116, are useful in optimizing each I/O request as will become evident. The DEFINE EXTENT DATA CHANGED flag 116 is set whenever any change is made to the data in the Define Extent channel command word.

Now referring specifically to the PAVB control block 106 in FIG. 6, location 118 contains the address of a next PAVB control block location if one exists. Otherwise it contains a null value.

Location 119 contains the address of a first PAVA control block location. In this specific example, location 119 contains a pointer to a PAVA control block associated with the alias UCB for an unused device C078. Location 120 identifies the number of alias UCB's associated with the base UCB. In the specific example the PAVB control block for the base UCB C06C contains a "2". Location 121 contains a volume serial number as known in the art. Location 122 contains an address that points to the next one of the alias PAVA control blocks for requeueing as described more fully later.

Now referring to FIG. 7, a location 123 in each PAVA control block identifies the location of the PAVB control block associated with that PAVA control block. Location 124 contains the address of the next PAVA control block in the chain or a null value.

FIG. 5. also depicts a group of flags 125 that includes a SHRINK MODE ON flag 126 that reflects the state of any "SHRINK" that a user supplies as an entry to the configuration file. Step 84 uses the presence of a "SHRINK=YES" statement in the PAV configuration file to set the SHRINK MODE ON flag 126. Location 127 receives the time at which the PAV application begins, and location 128 contains a work area address. Location 129 contains pointers, ptr_PSQWK(n) to individual work areas that are useful in optimizing I/O requests from different physical processors in the host system. Generally with existing systems with $1 \leq n \leq 16$ physical processors, it is necessary to provide one such work area for each of the possible central processors that can access the primary data storage system 33 when this invention is implemented. The structure of these work areas is described later.

Figure 8:
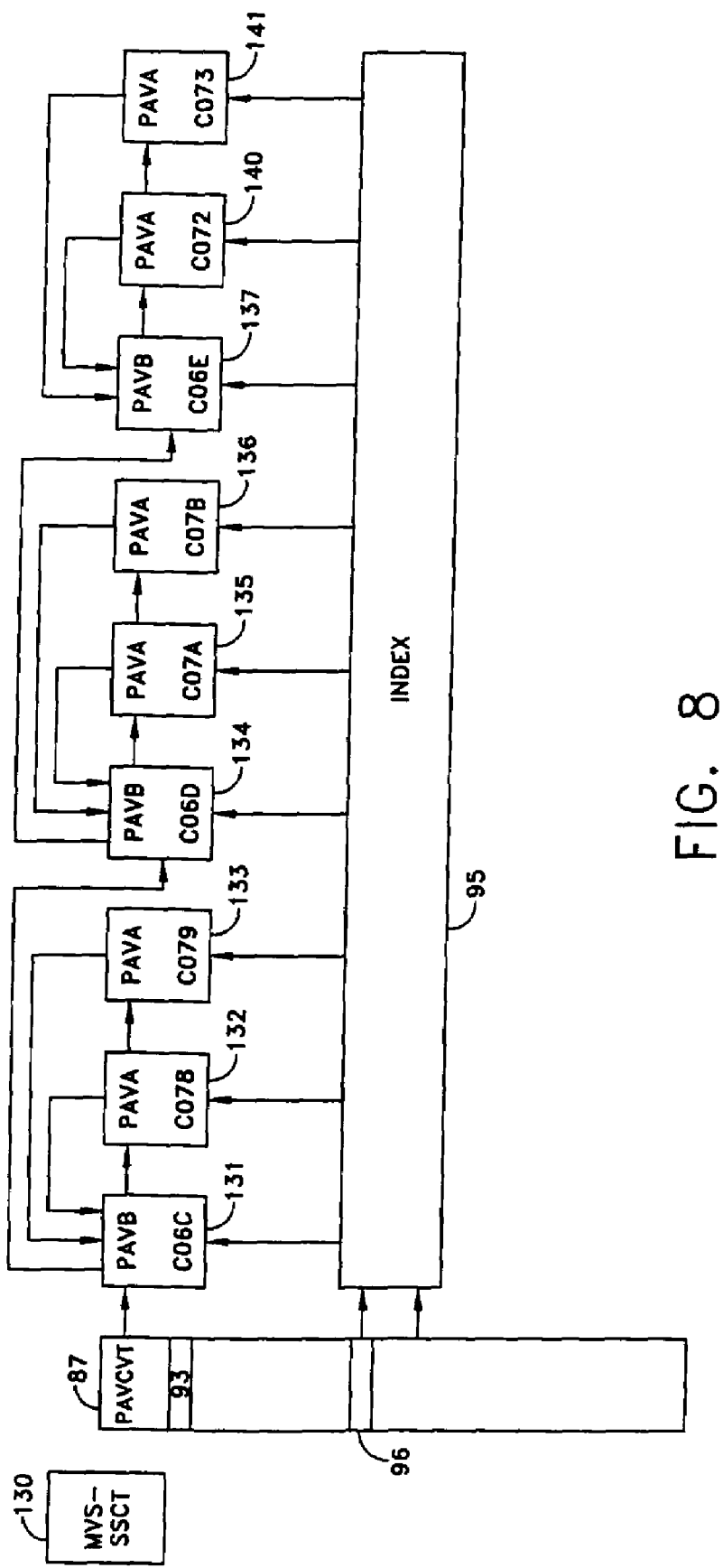
FIG. 8 is a block diagram that is useful in understanding the structure of the units shown in FIGS. 5 through 7.

When the method as shown in FIG. 4 is complete, the various portions of the common address base 50 in FIG. 2 and the various control blocks as shown in FIGS. 5 through 7 are constructed and populated with information so the system is prepared to respond to I/O requests from a user's application. In accordance with the specific example, this information can be represented by an object as shown in FIG. 8. Specifically an MVS_SSCT block 130 points to the PAVCVT control block 87. The first PAV base address in location 93 then points to a PAVB control block 131 associated with a device C06C. This control block is at the head of a chain of additional PAVA control blocks for alias UCB's for the same device with a PAVA control block 132 being associated with an alias UCB for the C078 UCB and a PAVA control block 133 being associated with an alias UCB for alias device C079.

The PAVB block 131 also contains a pointer (location 118 in FIG. 6) to a PAVB block 134 that in turn points to two PAVA blocks 135 and 136. A corresponding location in the PAVB control block 134 points to another PAVB block 137 in the chain. The PAVB block 137 points to two PAVA alias blocks 140 and 141.

As also will be evident from FIG. 7, each PAVA block points back to its parent PAVB control block. Specifically, each of the PAVA control blocks 132 and 133 points back to the PAVB block 131 by pointers in location 123.

Location 96 in FIG. 8 points to the PAV device index 95 of FIG. 2. The PAV device index 95 receives an input from the job statements that identifies an actual device or logical volume. The process for converting such as input into a pointer to a PAVB control block is well known in the art.

With this background it will now be possible to understand the procedure by which the PAV subsystem 83 shown in FIG. 2 allows multiple UCB's to address the same logical device. The process begins at step 150 in FIG. 9 when an application issues an I/O request. Step 151 processes that I/O request to identify the associated UCB, the conventional start I/O module of the operating system (e.g., the IOS-VSSCQ module in an MVS system) and related addresses. Step 152 then determines whether the identified device is a PAV device subject to the operation of this invention. Specifically, the system uses the device number in the command statement as an entry into the device index 95 to select a corresponding PAVB control block. If it finds that PAVB control block, then the I/O request does involve a PAV access. If not, step 153 transfers control to step 154 that transfers control to the MVS_STARTIO 56 module and normal processing continues.

If the identified device is a PAV device, step 155 tests the channel program syntax. More specifically, step 155 scans the channel program for several conditions. If there is a RESERVE pending, the test fails and the operation of FIG. 9 ends. If the first channel command word used is a Define Extent command or a seek command or if the first two channel command words are Set File Mask and Seek commands, the test is met and step 156 transfers control to step 160. Otherwise, the test of step 156 fails and control passes to step 154.

Step 160 uses the identified PAVB control block to retrieve the base UCB. Step 161 tests certain flags from the base UCB, namely: the hot I/O, MIH and busy flags. These flags are known to persons of skill in the art. One of these flags, the MIH flag, indicates that an interrupt has not been received within an acceptable time after the initiation of an I/O request. If any one of these flags is set, the UCB is considered to be busy. If the UCB is not busy, step 162 identifies the base UCB for use by the MVS_STARTIO module 56 and control transfers from step 162 to step 154. As will be apparent, this effects a normal MVS process. However, the time required to perform steps prior to step 162 are very short and do not materially effect the operation of any application program. The duration of the delay is more than offset by the advantages of enabling parallel accesses.

Parallel access occurs when the base UCB is busy. Step 161 then transfers control to step 163 that obtains the first PAVA address from location 119 in the PAVB control block 106. If the UCB for that PAVA control block is not busy, step 164 transfers control to step 165 that identifies this alias UCB for use by the MVS_STARTIO module 56. The MVS_STARTIO module 56 then can call the MVS_IOSVSCP module 58 to start the request for this UCB even though an I/O request for the base UCB is being processed simultaneously. Consequently the processing of the base UCB and alias UCB can occur in a time overlap situation.

If the first alias UCB is also busy, step 164 transfers to step 166 that determines if another alias exists. Specifically, this step tests the next PAVA address location 124 in FIG. 7 in the corresponding PAVA control block. If that location contains a null, there is no additional alias. If an additional alias exists, step 166 transfers control to step 167 to obtain the information from that next PAVA control block whereupon control transfers back to step 164 to determine if that UCB is busy. If it is not, this new alias device can then be used for processing the I/O request.

When an alias UCB, such as identified by one of the PAVA control blocks, is available step 165 transfers control to step 170. Step 170 sets an IOSUCB pointer in the IOSB block to identify the alias UCB. That is, if, in FIG. 8, the PAVB and PAVA blocks 131 and 132 both includes UCB's that were busy, step 170 would put the address of the C079 device UCB into the IOSUCB pointer.

Step 171 sets a flag in the MVS operating system that indicates that this IOSUCB pointer has been altered. Then control transfers to step 154 so the MVS_STARTIO module 56 can process the I/O request using the alias unit control block.

It is possible with a high I/O request rate for the base and all its related alias unit control blocks to be busy when an application generates an I/O request. In this case step 166 determines that all alias UCB's are busy. When that occurs, step 166 transfers control to step 172. Step 172 uses the next alias for requeueing the address in location 122 of the PAVB control block 106 in FIG. 6. Specifically, when this system is initialized, location 122 contains the address for the PAVB control block. Step 172 then uses this address to identify a device for the particular I/O request. When all the devices are busy, the request is queued to the base for the first time. The location 122 then is changed to point to the first PAVA control block. The next time all the devices are busy, location 122 points to the first PAVA device. It is updated with the NEXT PAVA ADDRESS from location 124. If additional requests require additional requeuing, the assignment to different ones of the PAVB and PAVA control blocks continues in a round robin fashion.

I/O Request Extent Optimization

When the MVS_STARTIO module 56 completes its operation in step 72 of FIG. 3, control passes to the EMC_IOSVSCP module 67. Normally the MVS_IOSVSCP module 58 generates a Define Extent command that the primary data storage system 33 uses to limit subsequent operations.

However, when the primary data storage system 33 receives this extent, it has no way of knowing in advance which tracks the ensuing commands will actually access during any given I/O request. The primary data storage system 33 also has no way to determine whether any of those ensuing commands will require a write operation. As will be apparent, it would be beneficial if the primary data storage system 33 used, as a "required extent", an extent with a starting track address corresponding to the lowest starting track address of all the input-output operations that the subsequent channel command words will access and an ending track address corresponding to the highest ending track address that will be accessed. This would free those tracks between the starting track addresses of the defined and required extents and those tracks between the ending track addresses of the required and defined extents for access by other requests from other applications.

The Define Extent command also includes a parameter that can be set to indicate that at least one command in the I/O request might involve a write operation. However, in prior art systems this "write intent" parameter is often set arbitrarily even though no write command exists in the I/O request. The optimization feature of this invention provides a benefit of testing each command in an I/O request to determine the actual existence of a write command and to establish an appropriate value for the "write intent" parameter. Both these capabilities provided by this invention will enable the primary data storage system 33 to achieve a much higher rate of parallelism in all I/O requests, either from overlapped I/O requests from a single host, I/O requests from multiple hosts or a combination of both particularly if any of the requests involves write operations.

Figure 10B:
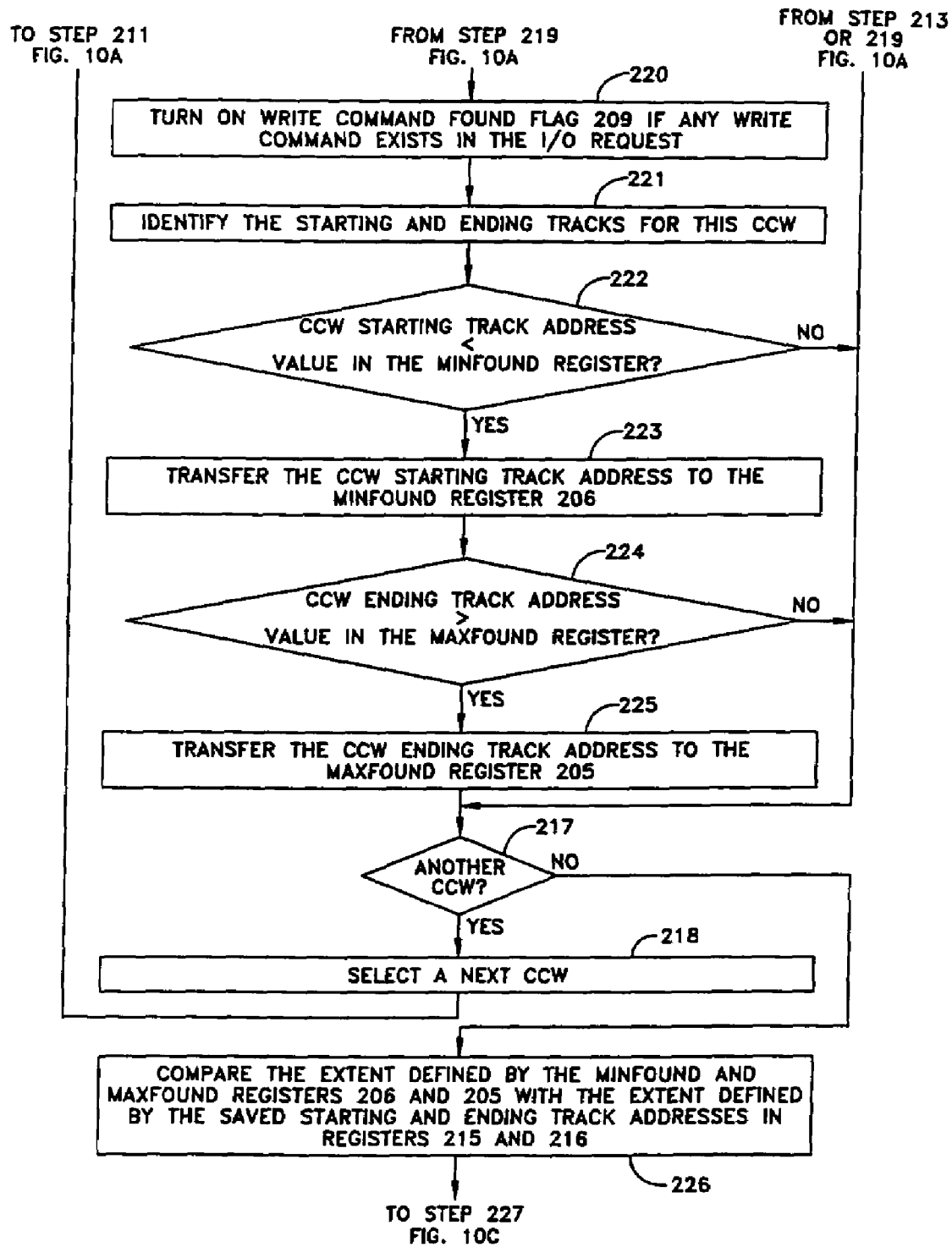
Figure 10C:
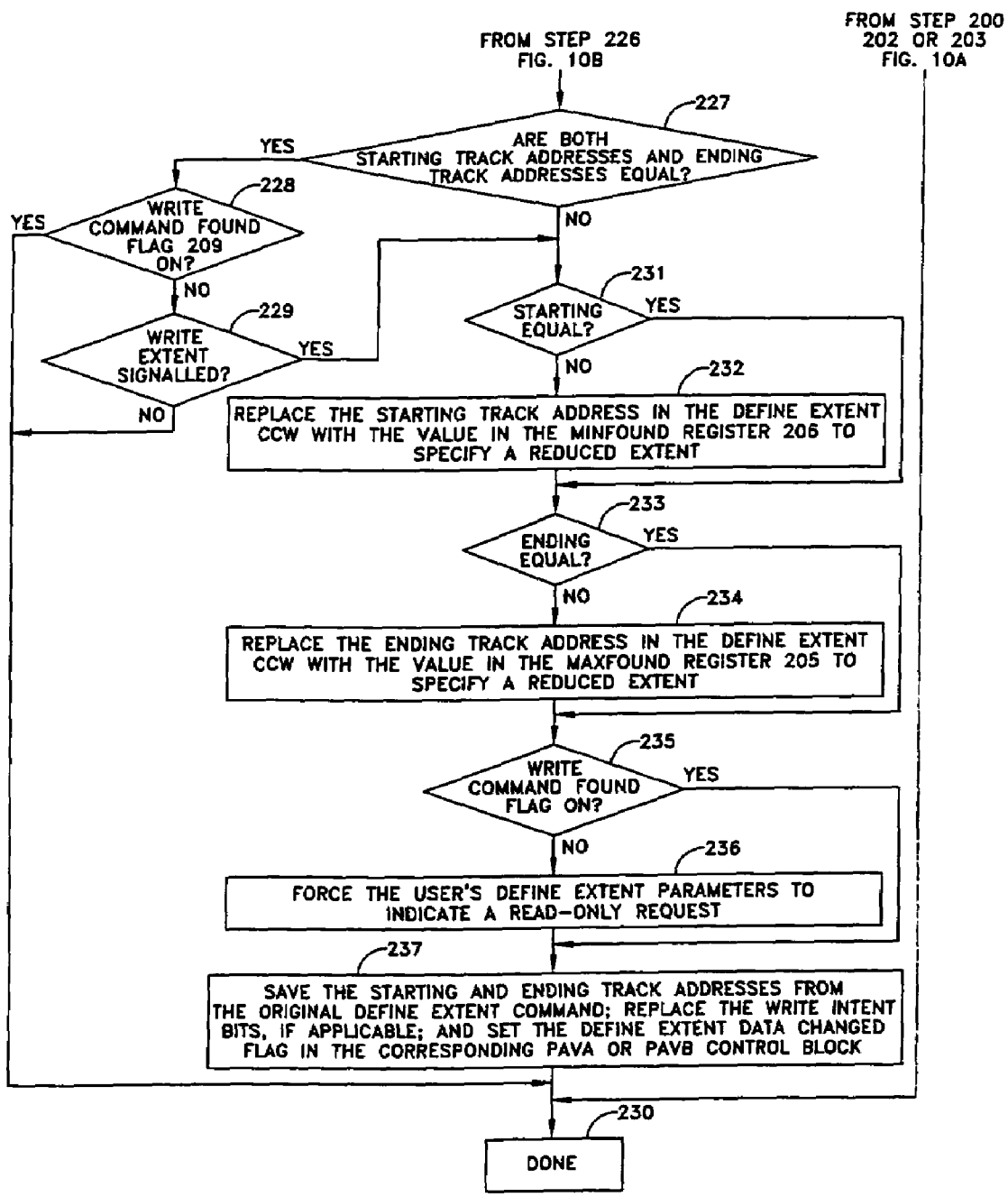

This EMC_IOSVSCP module 67 operates as shown in FIGS. 10A through 10C to provide these capabilities. In essence, the EMC_IOSVSCP module 67 scans all the channel command words to determine whether, for that particular I/O request, it is possible to reduce the defined address extent to be sent to the primary data storage system 33 and to identify the actual existence of a write command in the I/O request. The first operation occurs in the EMC_IOSVSCP module 67 when step 200 examines the SHRINK MODE ON flag 126 in FIG. 5. If that flag has been set, control passes to step 201 to locate the corresponding PAVA or PAVB control block. If this optimization feature is implemented without the parallel access volume feature, an analogous control block will be located. If this system operates with multiple central processors, step 201 will also locate a work space by setting a ptrPSQWK(n) pointer to a workspace that is dedicated to the operations with a specific host central processor associated with this I/O request.

Whenever an I/O request is made, it is possible that the I/O request must use only one channel path for all of its data transfers. Such "guaranteed path" requests usually are involved when the need for error recovery is anticipated. An "alternate path retry" provides a similar function. In this case, if an I/O request starts out using one path and fails, the error recovery routine will try to perform the same I/O over an alternate path. If either condition is found, the operation of the EMC_IOSVSCP module 67 ends.

Figure 11:
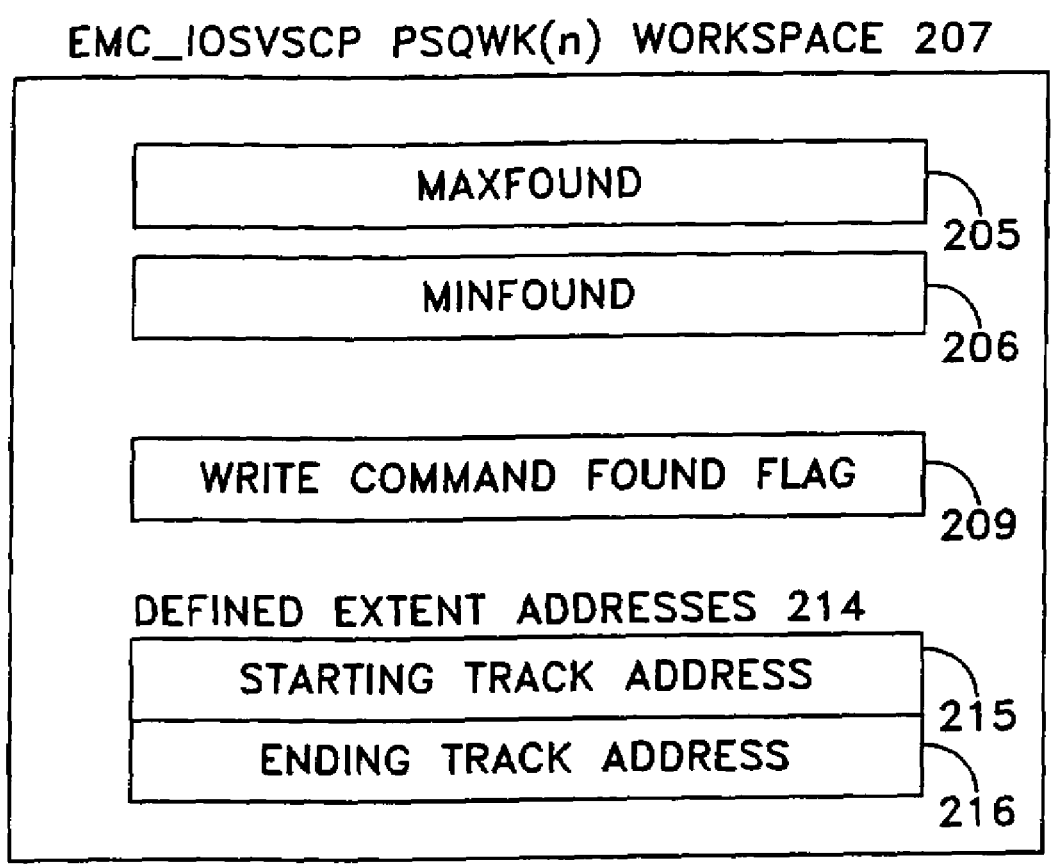
FIG. 11 is a logical map of a workspace that is useful in the method of FIGS. 10A through 10C.

If neither of these conditions exists, step 202 and step 203 transfer control to step 204 that initializes MAXFOUND and MINFOUND registers 205 and 206 in a PSQWK work space 207 shown in FIG. 11 for use by the EMC_IOSVSCP module 67. In one particular embodiment step 204 initializes the MAXFOUND register 205 to a low value, such as X'00' and the MINFOUND register 206 to a high value such as X'FF'. Step 208 completes the initialization by clearing a DEFINE EXTENT DATA CHANGED flag 116 in a corresponding one of the PAVB or PAVA control blocks of FIGS. 6 and 7 and a WRITE COMMAND FOUND flag 209 in FIG. 11.

Step 210 then obtains the first channel command word in the I/O request and step 211 scans that selected channel command word. If that command is a Define Extent channel command word, step 212 transfers control to step 213 that saves all the parameters in the Define Extent channel command word including the write intent parameter in the workspace 207. The starting and ending track addresses are stored in Define Extent addresses 214, specifically in a starting track address register 215 and an ending track address register 216. Control then transfers to step 217 in FIG. 10B because the processing has been completed on the Define Extent command. Assuming another channel command word exists in the I/O request, control passes from step 217 to step 218 to select a next channel command word and then back to step 211 to scan that selected channel command word.

When a next channel command word is accessed, it will not be a Define Extent command; so step 212 in FIG. 10A transfers control to step 219 to determine whether the channel command word involves any track access. If it does not, no further processing is needed so control passes back to steps 217 and 218 in FIG. 10B to obtain the next channel command word.

When a channel command word is found that will access tracks, step 220 in FIG. 10B refers to the information obtained in step 211 in FIG. 10A. If a write command actually exists in the I/O request, step 220 in FIG. 10B will set the WRITE COMMAND FOUND flag 209 in FIG. 11. Next step 221 identifies the starting and ending tracks. Step 222 then tests the channel command word for the starting track address against the value in the MINFOUND register 206 in FIG. 11. When a first channel command word is processed in step 222, the starting track address will be less than the X'FF' initial value in that register. So step 223 will replace the value in the MINFOUND register 206 with the CCW starting track address. A similar process occurs with respect to the ending track address. Step 224 compares the ending track address from the channel command word with the value in the MAXFOUND register 205. If the ending track address is greater than the value in the MAXFOUND register 205, step 225 transfers the ending track address from the channel command word to the MAXFOUND register 205.

Control then passes to step 217. Each successive channel command word in the I/O request is then processed in this manner. As will be apparent, if a particular channel command word has a lower starting track address than any previous channel command word starting track address, its value will be loaded into the MINFOUND register 206. Similarly, if the ending track address in any subsequent channel command word is greater than any previous ending track address, it will be loaded into the MAXFOUND register 205.

When all the channel command words in the I/O request have been tested, the MINFOUND register 206 will contain the lowest starting track address of all the starting track addresses in the channel command words; the MAXFOUND register 205, the highest ending track address. Step 226 compares the value in the MINFOUND register 205 with the starting track address in the register 215 and the address in the MAXFOUND register 205 with the ending track address in the register 216.

If both the starting track addresses and the ending track addresses are the same, step 227 in FIG. 10C transfers control to steps 228 and 229 to determine if the I/O request requires a write operation. If step 228 determines that the WRITE COMMAND FOUND flag 209 is set or if step 229 determines that the Define Extent command did not indicate an intent to perform a write operation, no optimization will occur for that I/O request. Specifically, even though an I/O request contains no write operations, the fact that the starting and ending addresses are equal means that no optimization will be effective. Control then passes to step 230 and the optimization process ends.

However, if no write operation will be involved but the Define Extent command indicates an intent to write, steps 228 and 229 transfer control to step 231. When the Define Extent command indicates an intent to write, then serialization of I/O requests will occur in the primary data storage system 33. When an I/O request only requires reading operations, changing the Define Extent command to indicate a read-only request will eliminate any needless serialization requirement for read-only I/O requests.

If step 232 determines that the starting track addresses are not equal, then by definition the address in the MINFOUND register 206 is greater than the starting track address in the register 215 so step 232 transfers the starting track address in the MINFOUND register 206 to the starting track address for the Define Extent channel command word. Similarly, if step 233 determines that the ending addresses are not equal, the ending track address in the MAXFOUND register 205 is less than the ending track address in the register 216, so step 234 replaces the ending track address in the Define Extent channel command word with the value in the MAXFOUND register 205.

Step 235 tests the WRITE COMMAND FOUND flag 209. If it has not been set, then the I/O request contains no write commands. Control then passes to step 236. Step 236 forces the user's write intent parameters to indicate a read only operation. Control then passes to step 237. Control also passes directly to step 237 from step 235 if the WRITE COMMAND FOUND flag 209 indicates the existence of a write command.

Step 237 then saves starting and ending track addresses in the original Define Extent command in a corresponding one of the PAVB and PAVA control blocks in FIGS. 6 and 7. The original starting and ending addresses, for example, are saved in the original bounds of extent location 115. Step 237 also assures that the write intent parameter in the Define Extent command reflects the actual requirements for the I/O request, and sets the DEFINE EXTENT DATA CHANGED flag 116 in the corresponding one of the PAVB or PAVA control blocks of FIGS. 6 and 7.

When this feature is combined with the parallel access feature of FIGS. 4 through 9, significant improvements in access can be achieved. For example, assume a file is allocated to all the tracks in cylinders 50 through 99 and that there are multiple jobs attempting to access this file simultaneously, some reading and some writing into it. Assume also that the Define Extent command specifies all fifty of these cylinders. I/O requests typically transfer only one block at a time from one track within one cylinder. If an I/O request only needs to write data into cylinder 55, track 8 and the Define Extent command covers all fifty cylinders, then an I/O request that wants to read data from cylinder 97 will have to wait until the first I/O request completes. If, on the other hand, the processes in FIGS. 10A through 10C determine that collectively all the channel command words in a particular I/O request are limited to accessing data from cylinder 55, track 8, then the read operation from cylinder 97 will not have to wait until the write I/O operation completes. Thus each chain of channel commands that is transmitted to the primary data storage system 33 in FIG. 1 will include a shrunk extent in accordance with values established by the actual data to be transferred and with the intent parameter set in accordance with the actual commands in the I/O request. The EMC_IOSVSCP module 67 of FIGS. 10A through 10C terminates with step 230. When this occurs, control passes to the MVS_IOSVSCP module 58 in FIG. 2 to initiate the I/O request using the altered address extent and other parameters if optimization has occurred.

Host Response to Completion of an I/O Request

As known, the primary data storage system 33 in FIG. 1 acknowledges the completion of each input-output operation. The MVS channel subsystem responds to this acknowledgement by generating an interrupt. When the PAV system of FIGS. 4 through 9 or the optimization method of FIGS. 10A through 11 is running, the EMC_I/O_INTERRUPT_TRACE module 69 intercepts each interrupt at step 250 of FIG. 12.

Step 251 tests the interrupt information to determine whether it is even associated with the primary data storage system 33 or any like device. If it is not, the there is no need for further processing in the EMC_I/O_INTERRUPT_TRACE module 69, so control passes directly to the MVS_I/O_INTERRUPT_TRACE module 64 at step 252. Otherwise step 253 locates the corresponding PAVB or PAVA control block in FIGS. 6 and 7 to obtain the appropriate parameters and arguments for processing. If no PAVB or PAVA control block can be found, step 254 transfers control to step 252.

If the interrupt is from a primary data storage system 33, step 255 examines the DEFINE EXTENT DATA CHANGED flag 116 in the corresponding one of the PAVB and PAVA control blocks in FIGS. 6 and 7. If this flag is not set, step 256 bypasses any further processing related to the optimization method. If the flag is set, step 256 transfers control to step 257 that replaces the Define Extent parameters that were with the data that was saved in the corresponding one of the PAVB and PAVA control blocks in FIGS. 6 and 7 in the Define Extent command for return to the host. Step 258 clears the corresponding one of the DEFINE EXTENT DATA CHANGED flags 116. This completes all the post request processing required by the optimization method.

Figure 12:
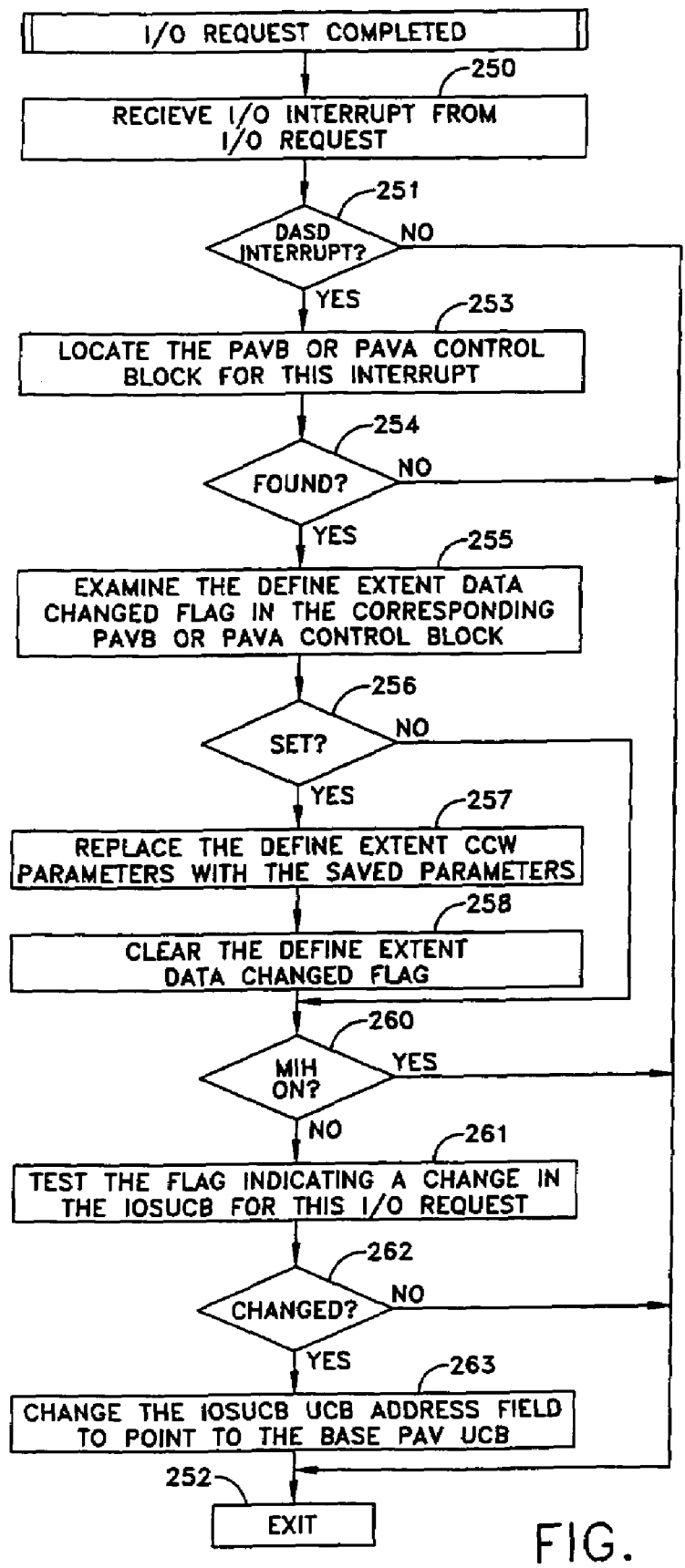
FIG. 12 is a block diagram that depicts a response to an indication of the completion of an input/output request in accordance with this invention.

When the optimization portion of FIG. 12 completes after processing step 258 or if the corresponding DEFINE EXTENT DATA CHANGED flag 116 is not set, control passes to step 260 that starts the post transfer processing required by the EMC_STARTIO module 65 in FIG. 2. Step 260 tests the MIH flag in the corresponding UCB. If the MIH flag is set, then the EMC_STARTIO module 65 has not acted on that transfer and control passes directly to the MVS_I/O_INTERRUPT_TRACE module 64.

Figure 9:
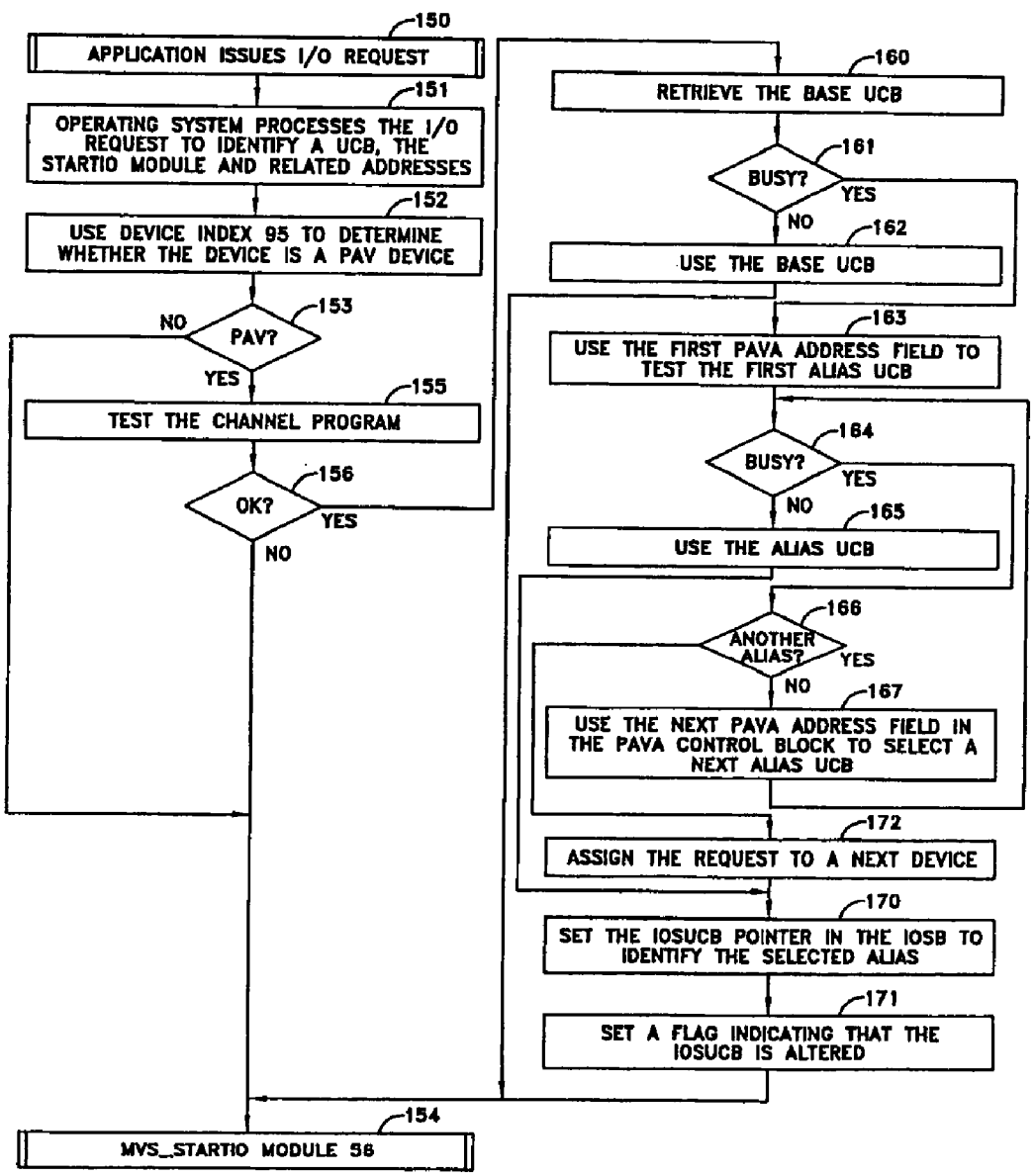
FIG. 9 is a flow diagram that depicts the operation of this invention in response to an I/O request.

Step 171 of FIG. 9 sets a flag whenever the IOSUCB has been altered as a result of the operation of the EMC_STARTIO module 65. Step 261 tests that flag. If it has been changed, step 262 transfers control to step 263 that replaces the IOSUCB pointer with a pointer to the base PAVB control block thereby to undo the change in that pointer made in step 170 of FIG. 9. If no change exists, or when the change has been undone, the system exits.

In summary, the PAV subsystem operating in a host system 20 in FIG. 1 enables a standard operating system, such as the MVS operating system, to issue I/O requests to the same logical storage device in an overlapping, rather than serialized, fashion. In essence to implement this an operator identifies an existing control block for the device and a number of alias control blocks within unused control block identifiers. Each I/O request is then tested and assigned to one of these alias control blocks that can then be dispatched to produce or to complete an I/O request. This occurs transparently to a user and introduces no significant delay to the operating processes in the host system 20. In addition, the optimization method preprocesses each request to determine the maximum extent that the actual transfers in the I/O request will require and to minimize the number of requests that "might" include a write command. That extent is then transferred to the primary data storage system 33 for controlling reading and writing operations that will occur in response to concurrent overlapped I/O requests provided by parallel processing or by the processing of I/O requests from multiple host applications.

Response of the Primary Data Storage System 33

As each of these I/O requests reaches the primary data storage system 33 in FIG. 1, it must handle those requests in an orderly fashion. Before describing this process, however, it will be helpful to review the interface between the primary data storage system 33 and a host application. As known, and previously indicated, whenever a host application generates an I/O request, the host converts the I/O request into a series of commands. A first command, such as a Define Extent command, identifies certain information about subsequent read and write commands in the I/O request. For example, the Define Extent command will identify the extent of tracks that all the following read and write commands in the I/O request might address. A host adapter, such as the host adapter 34 in FIG. 1, processes this command. If the command is processed successfully, the host adapter sends a message to the host that responds by sending a next command. This process repeats until all the commands in the I/O request have been transferred to and processed by the primary data storage system 33. Under some circumstances, as known, the host adapter message from the primary data storage system 33 to a requesting host processor will initiate any of several diverse operations. One establishes a disconnect-wait state within the host adapter while the primary data storage system 33 completes an operation. Another message may require the host to abort the I/O request and retry it after some delay.

The Define Extent command is one of a group of predetermined commands, another being a Prefix command. Each of these commands includes an extent definition. This extent may be the default value generated by the host application or a required extent if the optimization process depicted in FIGS. 10A through 10C is incorporated in the host. The Define Extent command will also indicate whether any write commands might be included in the I/O request.

A host adapter may supply additional information. In this specific embodiment, for example, the host adapter classifies the command as a "SYNC" command to identify I/O requests that require the entire logical device to be dedicated to that particular I/O request. For certain commands directed to disk adapters, the host adapter may classify the command as a DA REQ command to allow such commands to be processed without interruption.

Implicitly, a host adapter also knows, from its connections to the host system, the group ID Number, or GIDN, that identifies the host and channel. It will also obtain the identification of any base or alias device.

With the parallel access volume capability and the capability of receiving requests for the same logical device from multiple host processors, certain modifications are made to the primary data storage system 33. First a flag is set in a configuration file for the primary data storage system 33 indicating that the primary data storage system 33 has the capability of handling such multiple, concurrent I/O requests. This means that the primary data storage system 33 can receive commands associated with multiple I/O requests to the same logical device when the host uses a base or alias UCB.

Figure 13:
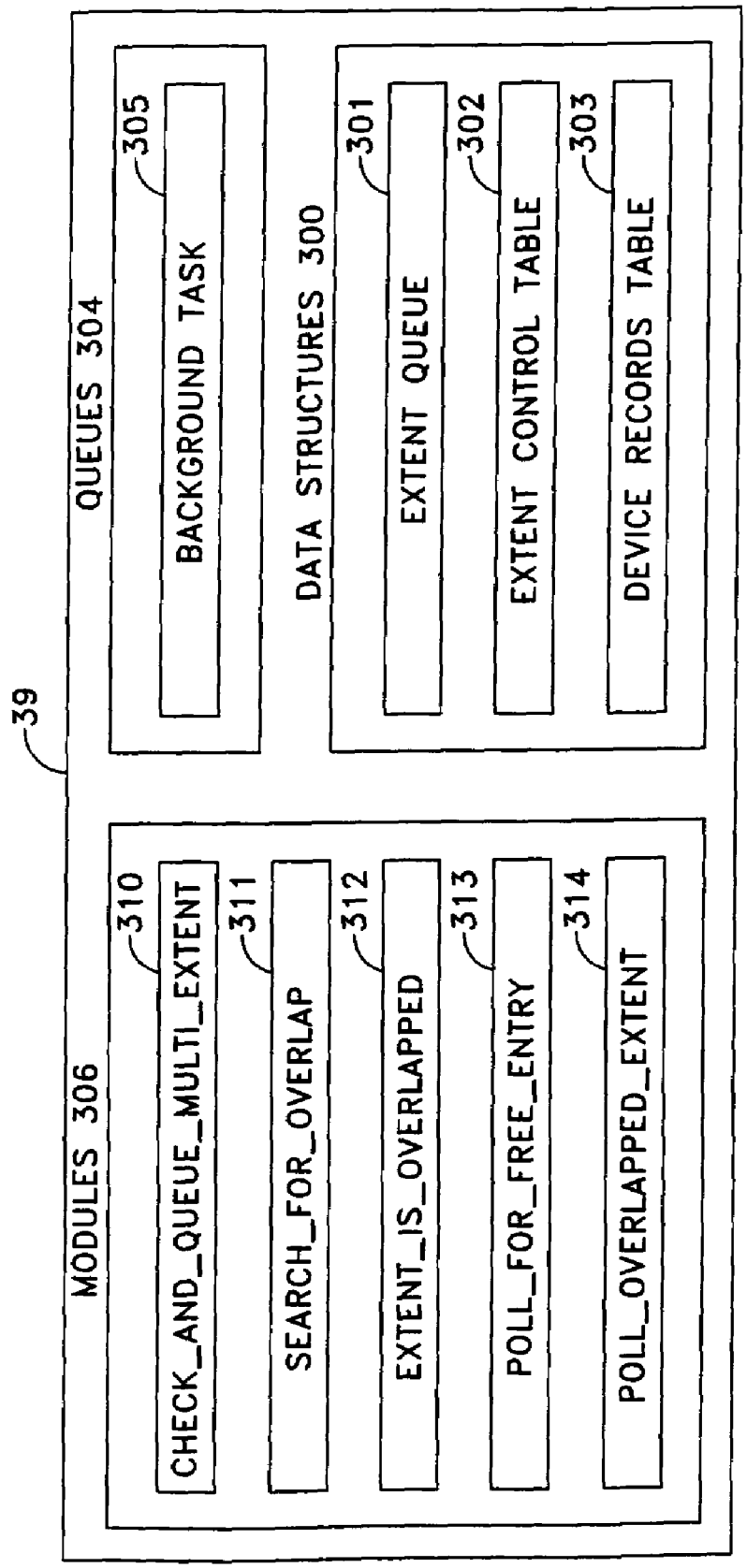
FIG. 13 is a block diagram of memory organization used by the primary data storage system 33 in implementing this invention.

FIG. 13 depicts certain modules and data structures that could be included in the control 39 of the cache memory 37 in FIG. 1 or elsewhere in the primary data storage system 33. Within data structures 300, this invention utilizes an extent queue table 301 and related extent control table 302. The data structures 300 also include a conventional device records table 303. The control 39 will also include a number of other queues 304. One, used in accordance with this invention, is a background task queue 305.

Additionally, the control 39 will include a number of modules 306 with exemplary modules being shown as a CHECK_AND_QUEUE_MULTI_EXTENT module 310, a SEARCH_FOR_OVERLAP module 311, an EXTENT_IS_OVERLAPPED module 312, a POLL_FOR_FREE_ENTRY module 313 and a POLL_OVERLAPPED_EXTENT module 314. The modules 310 through 314 are useful in examining certain incoming commands and determining whether subsequent operations related to each corresponding I/O request should be allowed to continue.

Figure 14:
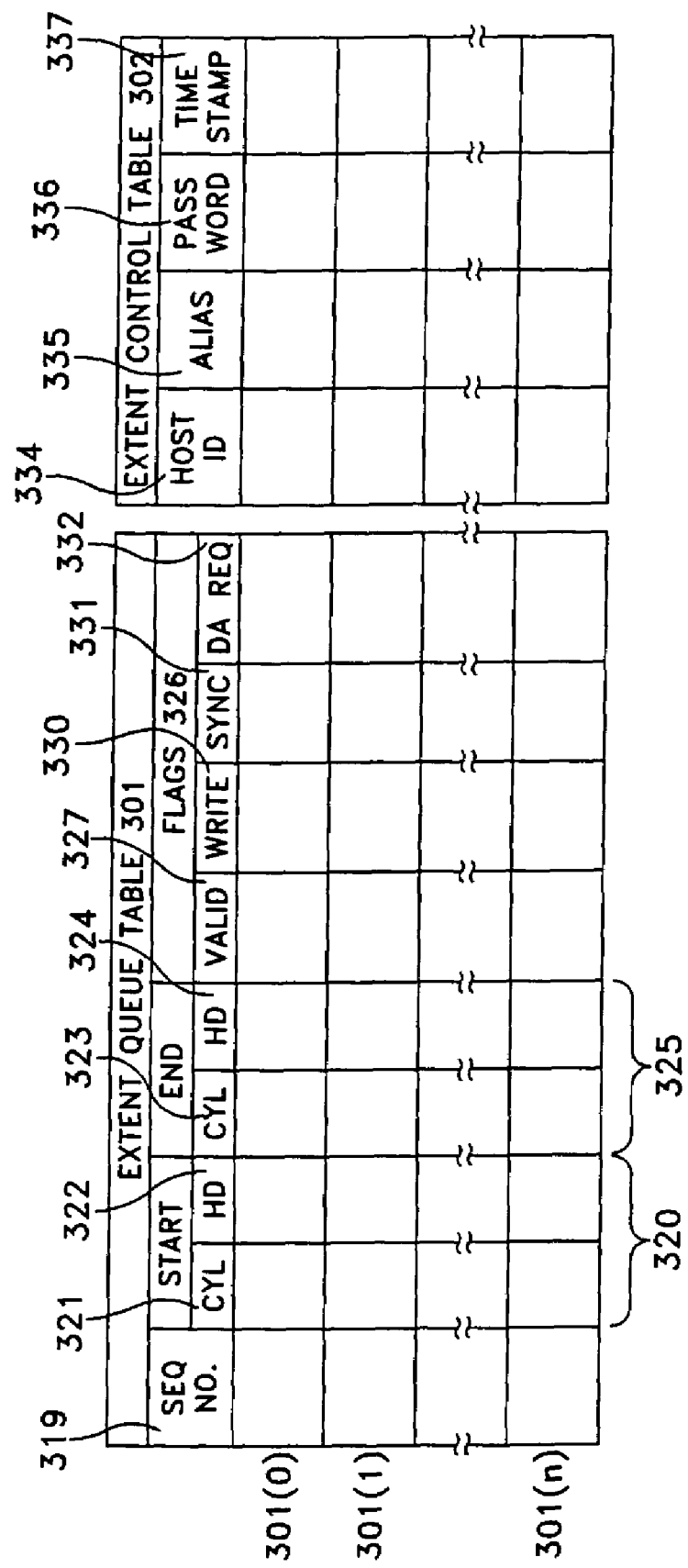
FIG. 14 discloses in detail two of the data structures of FIG. 13.

FIG. 14 depicts the extent queue table 301 and the extent control table 302 in greater detail. Each of the extent queue table 301 and the extent control table 302 have a corresponding number of entry positions. FIG. 14 depicts three specific positions identified by 301(0), 301(1) and 301(n). In one embodiment of this invention n=7, so there are eight positions. This is an arbitrary number. In the extent queue table 301, a sequence number field 319 will indicate the order in which entries are located in the extent queue table 301. Each entry in the extent queue table 301 also includes a starting portion 320 that, in this embodiment, identifies a starting track address by means of a logical cylinder address 321 and a logical head address 322. Likewise, a logical cylinder address 323 and a logical head address 324 define an ending track address 325.

The extent queue table 301 also includes a series of flags 326, namely a VALID flag 327, WRITE flag 330, a SYNC flag 331 and a DA REQ flag 332. The VALID flag 327 is set whenever the corresponding entry is valid. As will be disclosed later, the VALID flag 327 is set when an entry is made into the table. It is cleared when the entire I/O request has been completed, whether successfully or not. The WRITE flag 330 indicates whether any of the commands for the I/O request might include a write operation based upon the parameters in the Define Extent command. As previously indicated, certain I/O requests require that they operate with a logical device to the exclusion of all other I/O requests. The SYNC flag 331 is set whenever a received Define Extent command parameter imposes that requirement. For certain operations of a DA command to a disk adapter, the DA REQ flag 332 may also be set, again in response to the parameters included in a received Define Extent command.

The extent control table 302 has another series of values including a HOST ID field 334 that will receive a GIDN associated with each I/O request. The generation of a GIDN is known in the art. An ALIAS field 335 contains the identity of the base or alias UCB associated with the I/O request. An optional password field 336 can be updated with a predetermined entry any time an entry is transferred into the extent queue table 301 and entry control table 302 to provide a validity check. A time stamp entry 337 records the time at which each entry is made into the extent queue table 301 and extent control table 302. It provides information for timeouts and other purposes.

Each entry is linked. That is, the first entry in sequence in the extent queue table 301 is linked to the first entry in the extent control table 302.

The extent queue table 301 and extent control table 302 enable both parallel concurrent access to a single logical device and concurrent access to a logical device from multiple host processors. In the latter, or multi-allegiance case, the HOST ID field 334 and ALIAS field 335 provide an express I/O host processor identification. Thus any response from the primary data storage system 33 to a host will be directed to the requesting host even when multiple host processors are involved. The extent queue table 301 and extent control table 302 fulfill a second role by monitoring each I/O request from different UCB's all directed to the same logical device concurrently.

The extent queue table 301 and extent control table 302 provide a means of assuring that at no time are two I/O requests, that include at least one write command, operating on the same data in the same extent or any portion of the same extent at the same time.

Figure 15A:
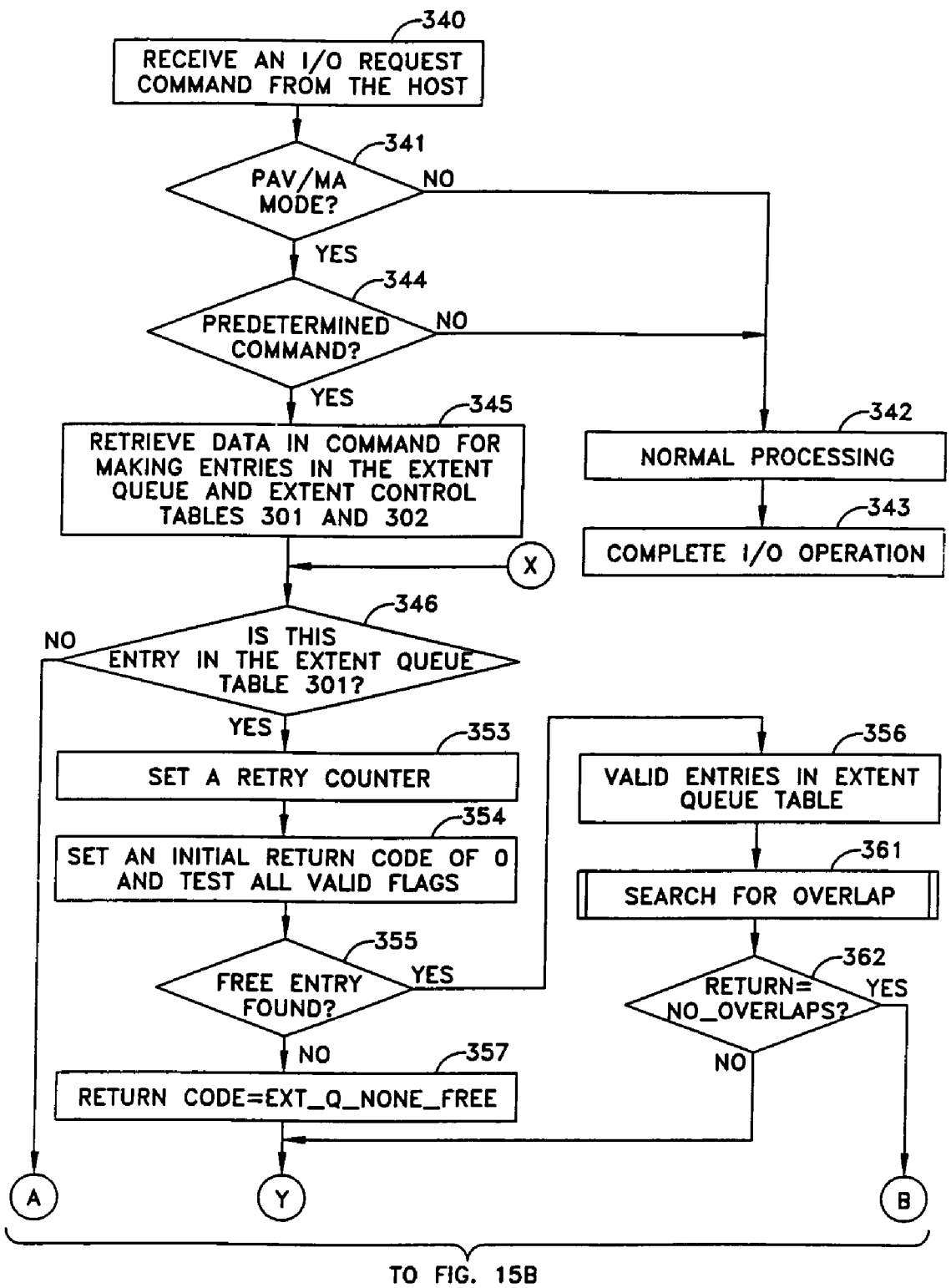
FIGS. 15A through 15C depict a method for implementing this invention within the primary data storage system 33.

Referring now to FIG. 15A, a host adapter 34 in the primary data storage system 33 of FIG. 1, receives an I/O request command from a host at step 340. If the primary data storage system 33 is operating in a prior art mode, step 341 transfers control to procedure 342 for normal processing and completion of the I/O operation in step 343. The normal processing operation of procedure 342 includes the prior art locking of the logical device during the processing of one I/O request to the exclusion of all other I/O requests.

If, however, the primary data storage system 33 is capable of operating with this invention, step 341 transfers to step 344 that tests the command received in step 340. If the received command is other than one of the predetermined commands, such as the Define Extent command or the Prefix command step 344 transfers control to step 342 for normal processing. If the command is one of those predetermined commands, step 344 transfers control to step 345 that scans the command to obtain information to be incorporated in the extent queue table 301 and extent control table 302 entries. Step 345 represents a first step in the CHECK_AND_QUEUE_MULTI_EXTENT module 310. Within this module step 346 determines whether this particular received entry is already present in the extent queue table 301. Generally the received entry will not be in the extent queue table 301. It would be in the extent queue table 301 if the command were being repeated for some reason as described later. Normally, therefore, step 346 transfers through steps 347 and 350 in FIG. 15B to step 351 in FIG. 15C. At this point the return value is "0", so step 351 transfers to step 352 that copies the extent number and sequence number to a device record, such as the device records table 303 of FIG. 13, and makes an entry into the extent queue table 301 and extent control table 302 and sets the password and the time stamp fields. Then, the host adapter 34 signals a successful completion of the operation and enables the next command in the I/O request to be transferred from the primary data storage system 33. In that case the command is received at step 340 and step 344 will transfer control to step 342 for normal processing.

If step 346 in FIG. 15A determines that the entry already exists in the extent queue table 301, the module 310 attempts to find a free entry repeatedly. Step 353 in FIG. 15A initializes a retry counter. Step 354 sets an initial return code value of "0", that indicates success, and tests the entry VALID flags for all the entries in the extent queue table 301. If any of those flags is found to be cleared, a free entry exists so step 355 transfers control to step 356 that indicates space exists for an entry in the extent queue table 301. If no space is found, step 357 sets a return code to an EXT_Q_NONE_FREE value indicating a full extent queue table 301 and control transfers to step 360 in FIG. 15B that determines whether all the retries have been completed. If they have not, control passes back to step 346 to run all the tests again. When all the retries have been completed without success, step 360 transfers to step 347 with an EXT_Q_NONE_FREE return value to begin a decoding process based upon the value of the return.

Figure 16:
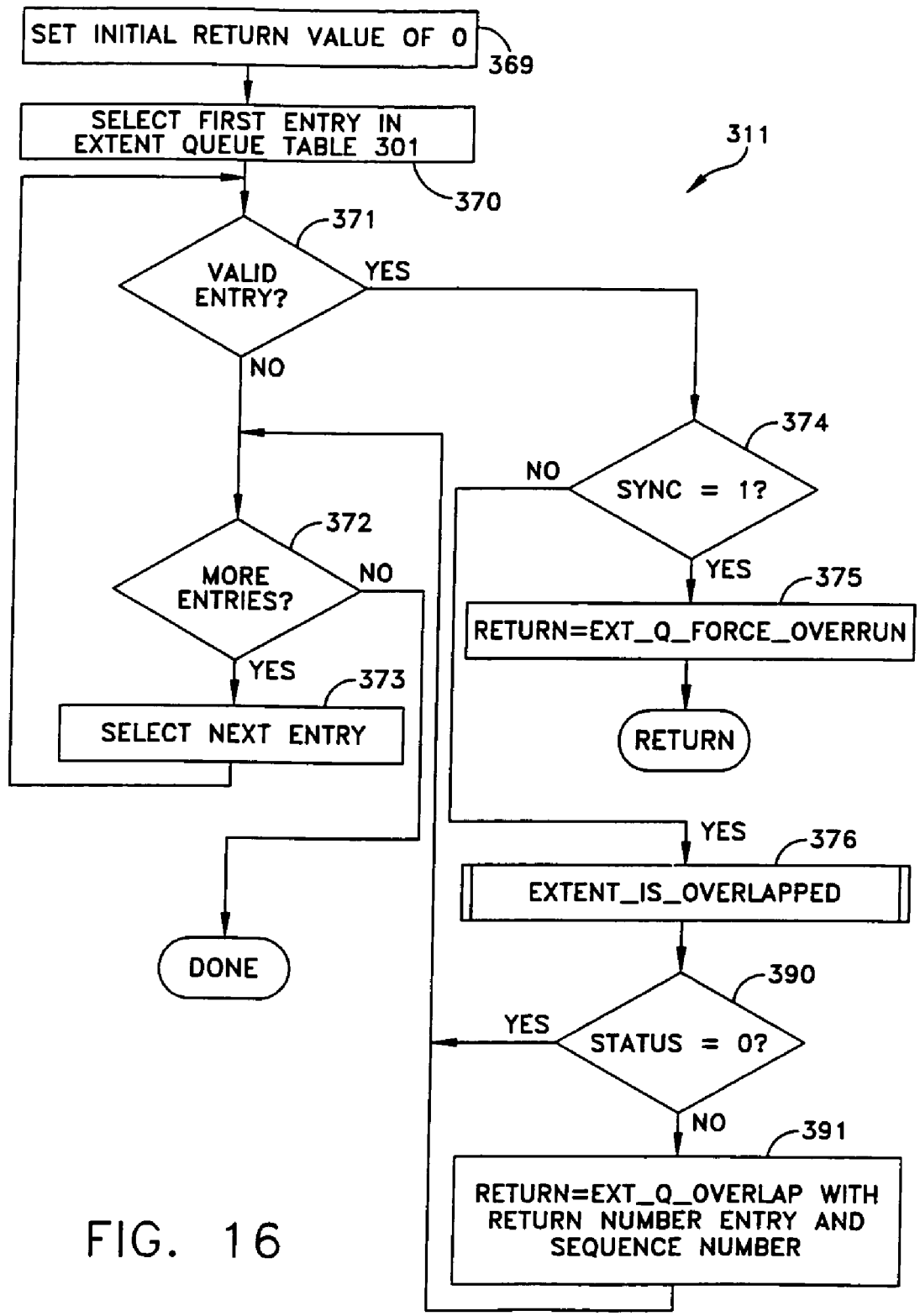
FIG. 16 is a submethod for determining overlaps as shown in FIG. 15A.

If valid entries exist, step 356 transfers to step 361 that initiates a search for overlaps before storing the entry finally in the extent queue table 301. FIG. 16 depicts the procedure of step 361 in greater detail. Specifically FIG. 16 depicts SEARCH_FOR_OVERLAP module 311. This module begins when step 369 sets an initial value of "0" for the return code. Step 370 selects a first entry in the extent queue table 301. Step 371 tests the VALID flag 327. If it is not set, step 371 transfers to step 372 and step 373 that control a loop to obtain a next entry from the extent queue table 301 in FIG. 13. If a valid entry is found, step 371 in FIG. 16 transfers to step 374 to test the SYNC flag 331. If the SYNC flag is set, step 375 establishes an EXT_Q_FORCE_OVERRUN return code indicating that no other I/O requests should be handled until such time as any SYNC entry in the extent queue table 301 has been completed. If the SYNC flag is not set, step 374 transfers to step 376 that uses the EXTENT_IS_OVERLAPPED module 312 to determine if any overlap exists between the starting and ending track addresses of the entry in the selected entry of the extent queue table 301 and the starting and ending track addresses for the record entry being analyzed.

Figure 17:
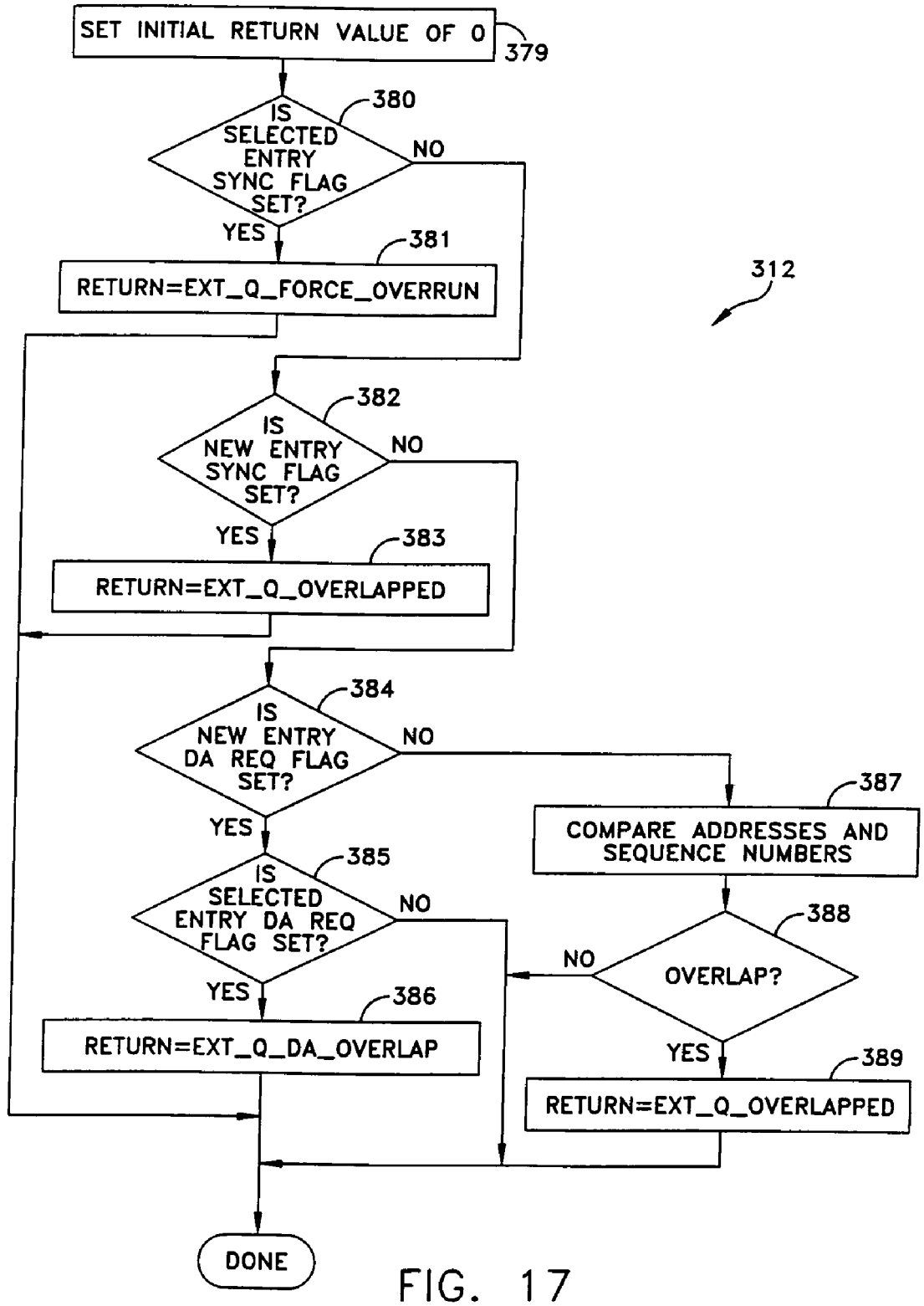
FIG. 17 is a submethod of FIG. 16.

FIG. 17 depicts the EXTENT_IS_OVERLAPPED module 312 that begins by setting an initial return value of "0"

in step 379. Step 380 tests the SYNC flag 331 in the selected entry from the extent queue table 301. If that flag is set, the return is set to an EX_Q_FORCE_OVERRUN value in step 381, and the module 312 terminates its operation. This module can be called at other times within the processing of one of the predetermined commands. At this particular time, however, the SYNC flag will not be set. If it had been, prior analysis would have prevented the process from proceeding to this point.

When the SYNC flag is not set, the module tests the SYNC flag in the new entry that is being analyzed in step 382. If that SYNC flag is set, the return is set to an EXT_Q_OVERLAP value in step 383. Again, as any entry with the SYNC flag set must be handled to the exclusion of all other entries, no additional analysis is needed.

If neither of the SYNC flags 331 is set, step 384 tests the DA REQ flag in the new entry. If it is set, step 385 determines whether the DA REQ flag 332 for selected entry is set. If it is, step 386 generates an EXT_Q_DA_OVERLAP return value. If neither SYNC flag is set and if the DA REQ flag in the new entry is not set, control transfers from step 384 to step 387 that compares the addresses in the new entry and the selected entry from the extent queue table 301 as stored in the starting and ending track addresses 320 and 325 and the sequence numbers. Specifically, an entry will be considered to be overlapped if there is an overlap in the address extent and if the entry being tested has a greater sequence number than an entry with an address overlap. For example, assume step 387 identifies an address overlap with an entry 1 and an entry 2. Further, assume that that entry 1 indicates a write intent and has a sequence number of 5 while entry 2 represents a read-only request with a sequence number of 6. Entry 2 will be held and considered to overlap entry 1 and will not be processed until entry 1 is cleared from the table. The same sequence would occur if entry 1 were the read only request and entry 2 was a request with an intent to write. If an overlap exists, step 388 transfers control to generate an EXT_Q_OVERLAP return in step 389. Otherwise the module 312 terminates its operations. If the DA REQ flag 332 for the selected entry is not set, step 385 ends the procedure of FIG. 17 with a "0" value return code.

When the EXTENT_IS_OVERLAPPED module 312 completes its operation, control returns to step 390 in FIG. 16 that tests the return code. If it is a "0", control transfers to step 372 to test any additional entries in the extent queue table 301. If the return value is other than a "0", an overlap condition exists, so step 391 sets a return value of EXT_Q_OVERLAP with a return number entry and a sequence number for the overlapping entry for use by the POLL_OVERLAPPED_EXTENT module 314. Then control transfers to step 372 to test additional entries.

When the SEARCH_FOR_OVERLAP module 311 in FIG. 16 completes its operation, step 362 in FIG. 15A determines the return status. If the return from the SEARCH_FOR_OVERLAP module 311 as initiated at step 361 shows that there is no overlap, control passes from step 362 to step 393 in FIG. 15B that attempts to write data into the entry of the extent queue table 301. Step 394 tests the entry to determine if any change has occurred. More specifically, it is possible for the information to be changed by some other application. If this occurs, then the information should not be placed in the extent queue table 301. If no change exists, step 394 transfers to step 395 that adds the information in the new entry into the extent queue table 301 and extent control table 302 at the selected location with the cleared VALID flag and the operation is complete. If a change has been made, step 394 transfers control to step 360 to allow a retry.

Figure 15B:
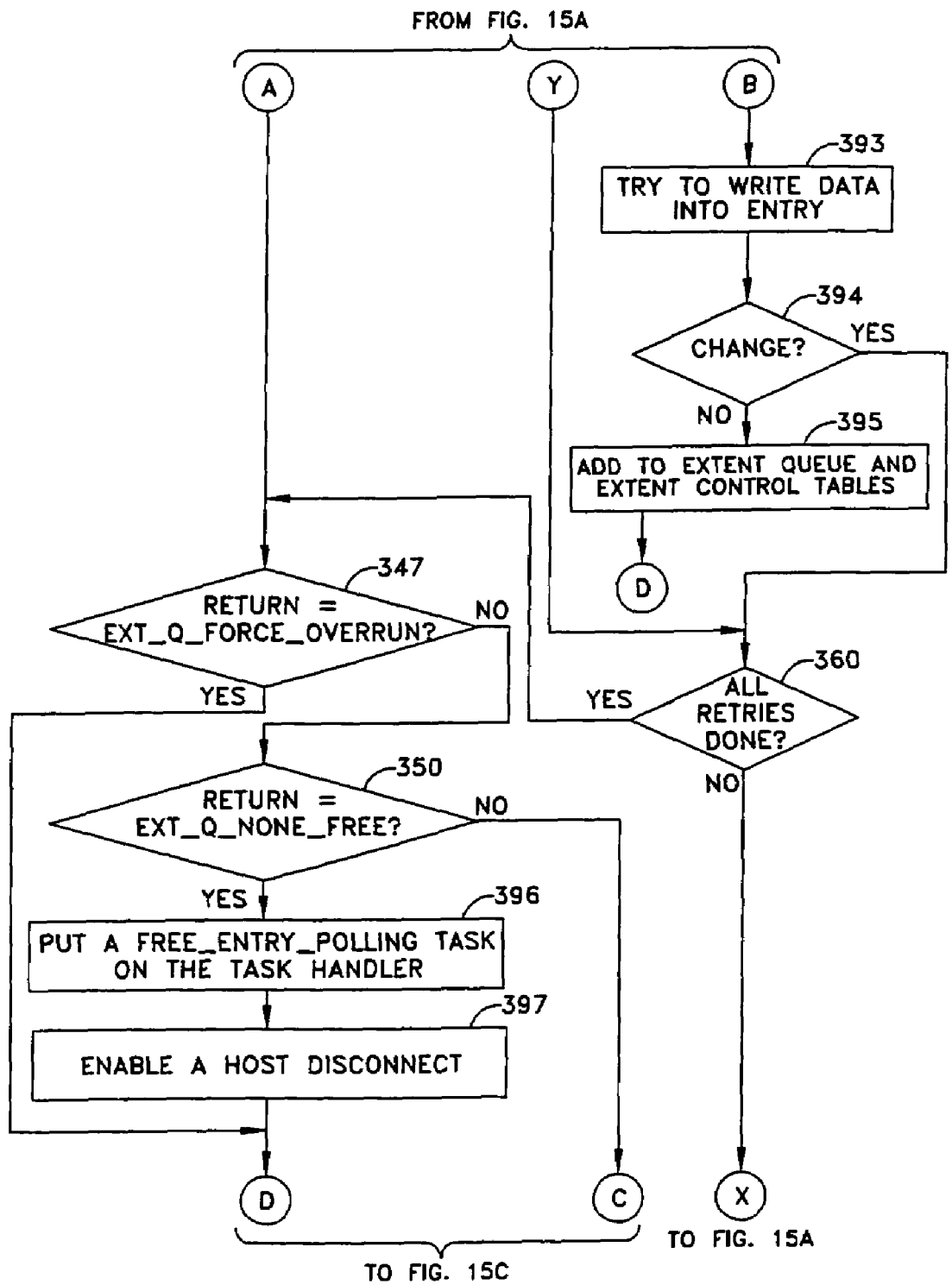

If the return from the SEARCH_FOR_OVERLAP module 311 at 361 in FIG. 15A indicates a problem, step 362 transfers control to the beginning of a decoding process with step 347 in FIG. 15B that will examine the return to determine if the return indicates a SYNC flag exists (i.e., RETURN=EXT_Q_FORCE_OVERRUN). If this occurs, control passes from step 347 and the process is complete. This return will cause the host adapter 34 to send a retry command to the host so that the host will make the I/O request at a later time.

Step 350 will decode an EXT_Q_NONE_FREE return and step 396 will put a FREE_ENTRY_POLLING task on the background task queue 305 including information about the entry. Then step 397 will enable the host adapter to generate a conventional host disconnect that will instruct the host to await necessary retries.

Figure 15C:
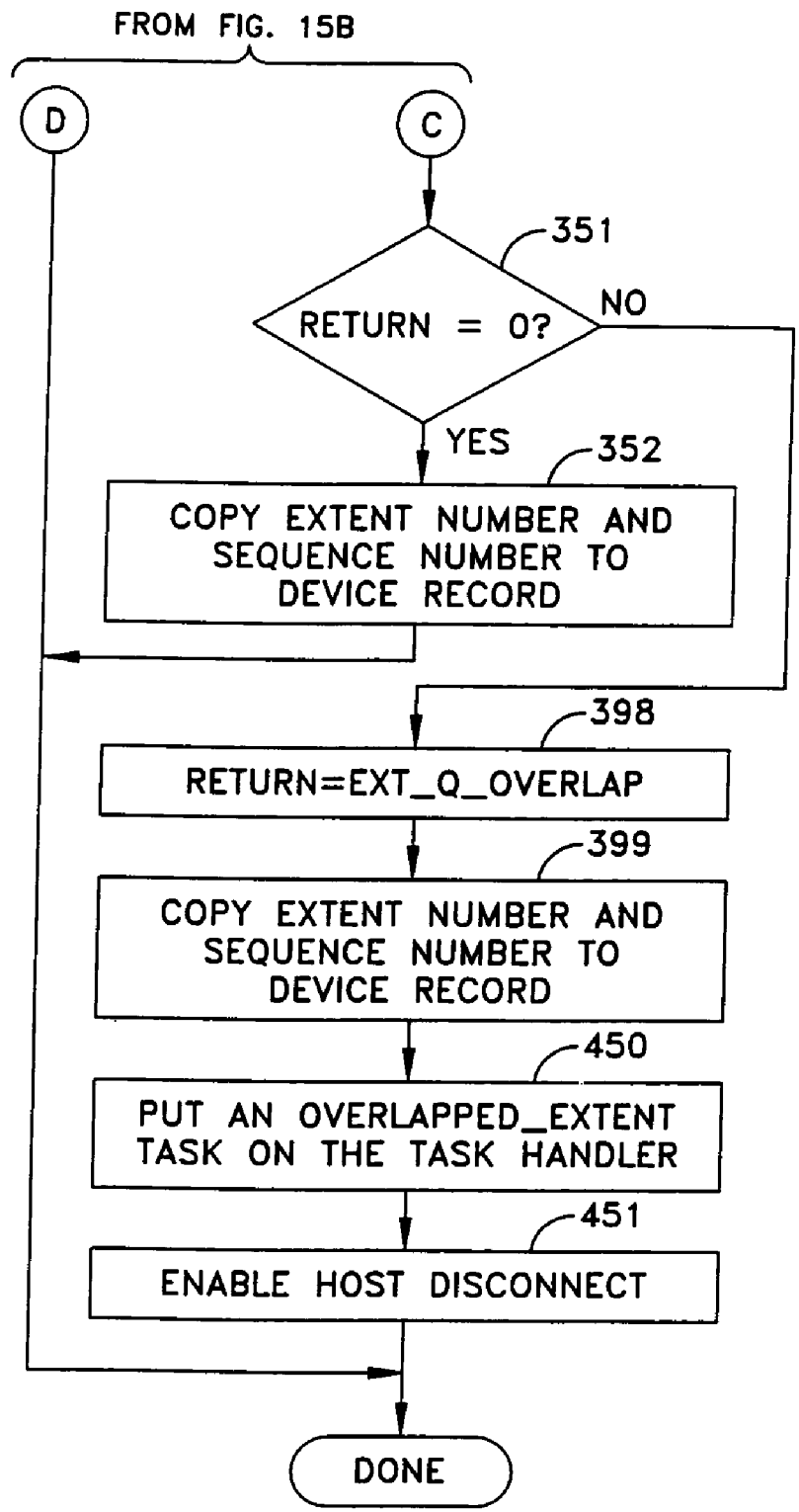

If the return is "0", indicating success, step 351 in FIG. 15C transfers to step 352 as previously indicated. Otherwise, the return indicates an overlap in step 398. Step 399 then copies the extent number and sequence number for the new entry to the device record. Step 450 places an OVERLAPPED_EXTENT task on the background task queue 305. Step 451 then enables the host adapter to send a host disconnect command to the host.

As previously indicated, certain of these processes will initiate a retry operation if the entry of information into the extent queue table 301 is not successful. Typically, retries relate to time out intervals. If the interval expires without success, then the host adapter 34 will send a retry error message to the requesting host.

There are two polling conditions. The first occurs if the process of FIG. 16 is unsuccessful in finding an available entry in the extent queue table 301. A conventional task handler will periodically monitor the task in the background task queue 305 and periodically select the POLL_FOR_FREE_ENTRY module 313, shown in FIG. 18. This module begins by setting an initial return value to the EXT_Q_NONE_FREE value in step 400 and selecting an entry in step 401. If the extent entry valid flag 327 is cleared, step 402 transfers control to step 403 that sets the return code to a "0" value. Step 404 then tests to see if more entries exist. If they do, step 405 selects a next entry and transfers control back to step 401.

If an entry is valid, step 402 transfers control to step 406 that tests the SYNC flag 331 in the extent queue table 301. If this is set, step 407 sets the return to an EXT_Q_FORCE_OVERRUN value and terminates the task. Otherwise step 406 transfers control to step 404.

Figure 18:
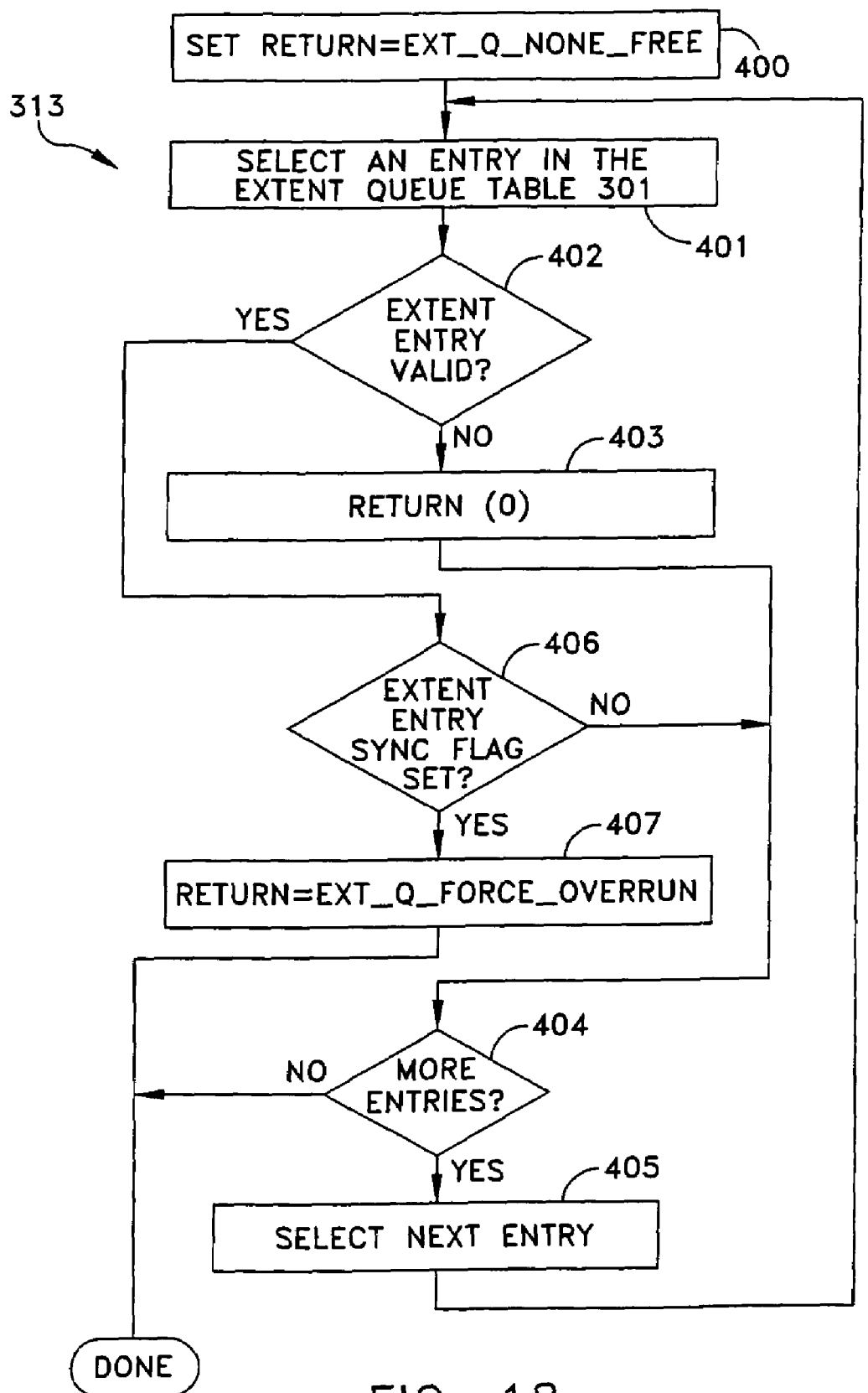
FIG. 18 depicts another module that is useful in this invention for obtaining free space.

Consequently if module 313 in FIG. 18 finds an invalid entry and no entry with a SYNC flag set, there is a free entry. The return value of "0" will enable the host adapter to attempt processing the interrupted command again.

Figure 19A:
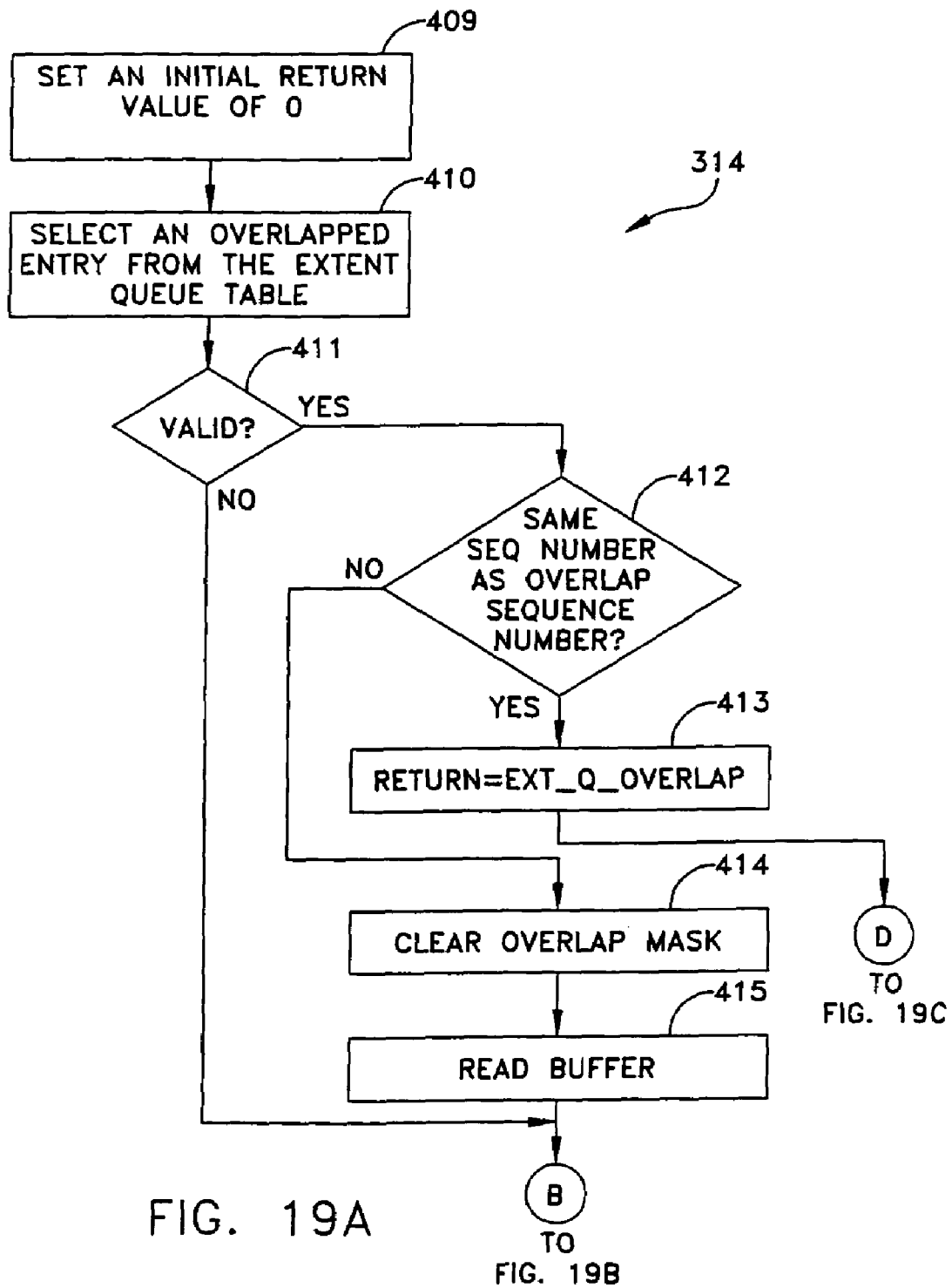
FIGS. 19A and 19C depict another module useful in accordance with this invention for determining the cessation of an overlap condition.

The POLL_OVERLAPPED_EXTENT module 314 identifies any conflicts that can be resolved because an overlap no longer exists. It begins in FIG. 19A by setting a return code to a "0" value in step 409 and selecting an overlapped entry from the extent queue table 301 in step 410. If the VALID flag 327 is set, step 411 transfers control to step 412 that compares the sequence numbers for the entry being tested and the selected overlapped entry. If those are the same sequence numbers, the overlap continues and step 413 terminates the sequence with the return code EXT_Q_OVERLAP. Otherwise the overlap no longer exists and step 412 transfers control to step 414 that clears the overlap mask.

Step 415 reads the device records to determine whether there any other elements that need to be tested for overlap. Thereafter, or if the selected entry is invalid as tested at step 411, step 416 in FIG. 19B selects another entry from the extent queue table 301 and tests its VALID flag 327 at step 417. If that flag is set, step 418 tests to determine if this is the same entry as the entry indicated to be in an overlapping relationship. If it is, step 419 tests the SYNC flag 331 and generates an EXT_Q_FORCE_OVERRUN return in step 420 and terminates the polling task if the SYNC flag 331 is set. Otherwise step 419 transfers to step 421 that establishes the overlap mask set for this entry. Step 422 uses the EXTENT_IS_OVERLAPPED module 312 to analyze the extent queue table 301 as previously described. If that is not successful, control passes through step 423 to step 424 that sets a return value of EXT_Q_OVERLAP. Step 425 determines whether any update to the highest sequence number is needed. If it is, step 426 makes that update. Otherwise step 427 clears the corresponding bit in a mask.

Figure 19B:
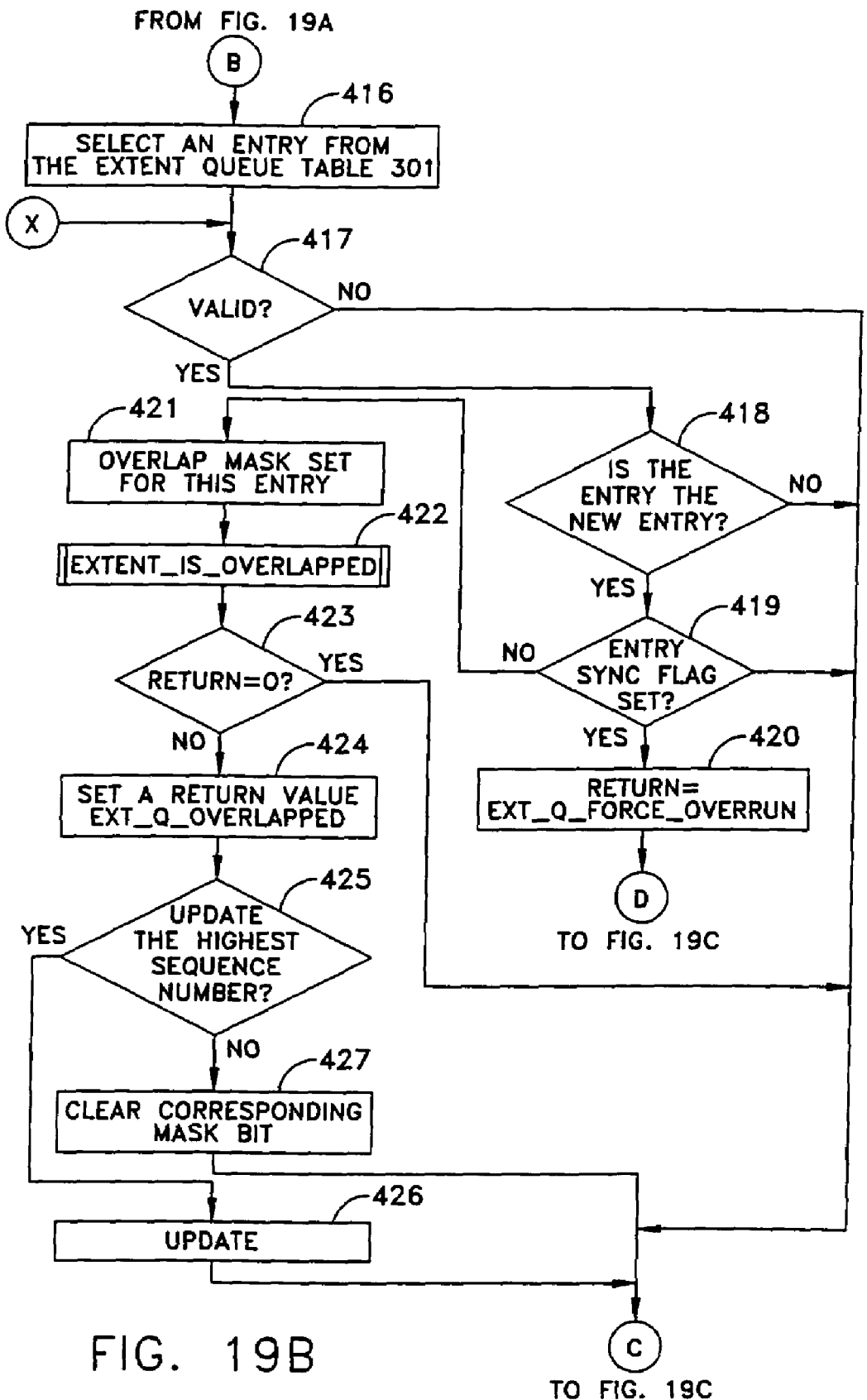
Figure 19C:
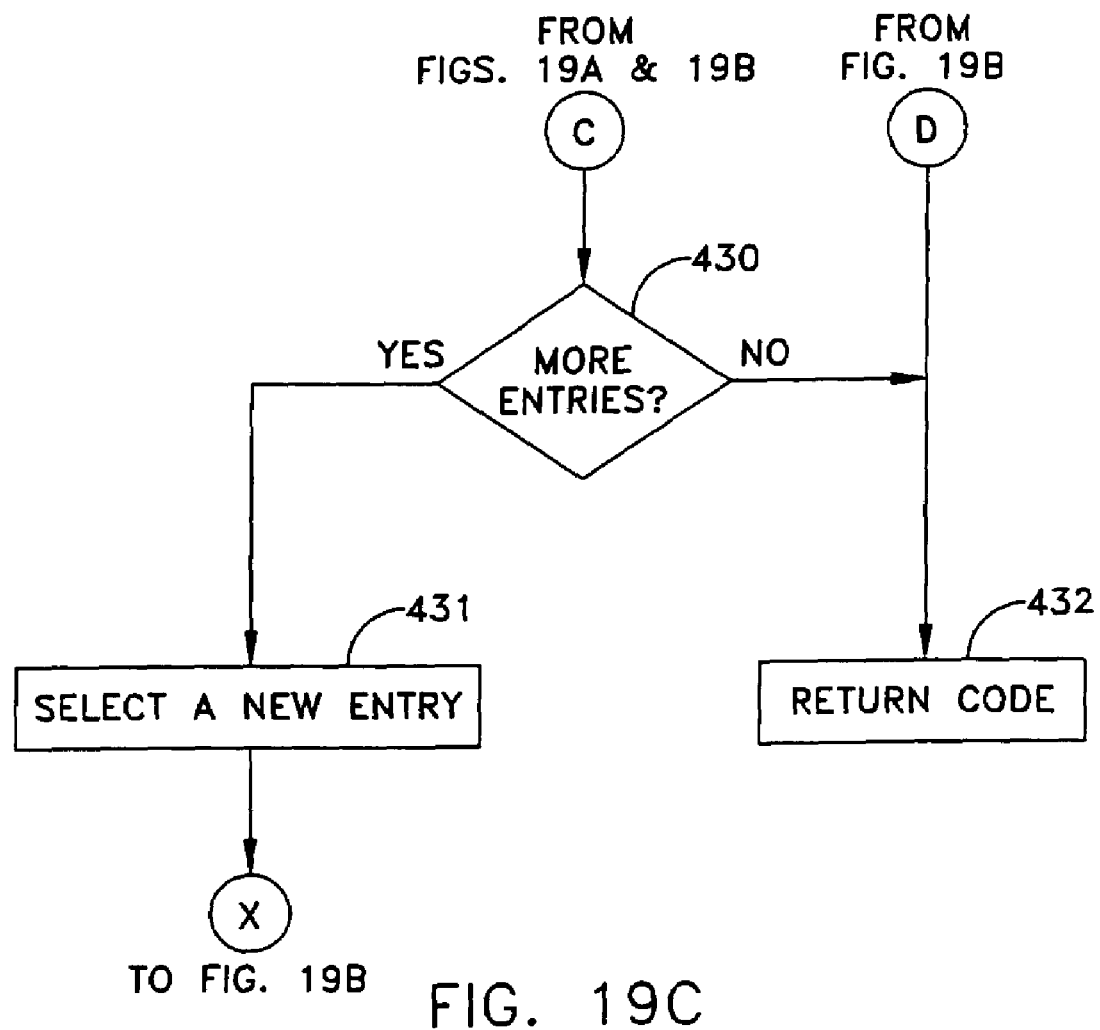

If steps 417 or 418 have negative results or after the analysis controlled by step 423, control passes to steps 430 and 431 in FIG. 19C that determine if more entries need to be tested with control transferring to step 417 in FIG. 19B. Otherwise the processing is complete, and step 432 generates the appropriate return code to indicate success or non-success. If success is realized, the host adapter 34 will attempt to process the overlapping command again.

When an entry is on the extent queue table 301 and there are no overlaps, the successive commands for the corresponding I/O request are handled normally. However, it will be apparent that two or more I/O requests will be permitted to operate in the primary data storage device 33 so long as there is no overlap and so long as no other conditions, such as the existence of a write command in an I/O request, preclude such operations.

When the disk array storage device operates in this mode, the extent queue table 301 and the extent control table 302 act as a queue for input-output requests. A conventional task handler that responds to normal I/O requests now uses information in the tables 301 and 302 for actually performing the transfers that each I/O request defines. Such task handlers are well known in the art.

In summary, it will now be apparent that this invention can improve the rate at which data transfers will occur. Conventionally when successive I/O requests are made to a single logical volume, they are serialized at the host level. Significant delays can occur because no processing of a second I/O request can begin until after the host processes the first I/O request including the time required to send the I/O request to the disk array storage device, perform the defined function or functions and return information that allows the host to complete processing the first I/O request. This invention eliminates many of those delays. With this invention a host can process a second I/O request before the activity associated with the first I/O request has been completed because, in accordance with this invention, it is possible to generate multiple I/O requests through the use of the alias unit control blocks. There is still a further enhancement achieved by optimizing each I/O request so that a Define Extent command sent to the disk array storage system accurately defines the address extent that is involved and accurately indicates whether any write command exists in the I/O request. The use of the extent queue and extent control tables 301 and 302 enables the disk array storage device to handle these overlapped I/O requests in an orderly fashion. Further, these tables enable the disk array storage device to receive overlapped I/O requests from a single host or application or from diverse hosts and applications.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A program for storage in a computer readable medium for enabling a disk array storage facility to handle overlapped input-output requests to a single logical volume wherein each input-output request contains a plurality of predetermined parameters including an address range and the storage facility includes an overlap polling queue, said program comprising:
    A) a configuration module that establishes a table for the logical volume with entry input-output requests and corresponding parameters including the address range,
    B) a testing module that tests the parameters for each new input-output request with respect to the parameters for input-output request entries in the table including a comparison of the address range in the new input-output request with the address range of each input-output request in the table to determine whether to place the new input-output request on the overlap polling queue, and
    C) a polling module that responds to said testing module by performing one of a plurality of control functions to include enabling the processing of the input-output request by the storage facility by polling the entries on the overlap polling queue.

2. A program as recited in claim 1 wherein said polling module enables the new input-output request to be processed in response to the polling of entries on the overlap polling queue.

3. A program as recited in claim 1 wherein each input-output request includes other parameters and wherein said testing module compares each of the other parameters of the new input-output request with the corresponding parameters of the input-output requests in the table.

4. A program as recited in claim 1 wherein one parameter defines an input-output request that requires the entire logical volume to be dedicated to that input-output request, said testing module including:
    i) a process that terminates the program in response to a first value of the one parameter in an existing input-output request in the table, and
    ii) a process that places the input-output request on the overlap polling queue in response to a second value of the one parameter in the new input-output request.

5. A program as recited in claim 1 wherein an other parameter has a first value that defines an input-output request to be processed without interruption, said testing module including:
    i) a process that places the new input-output request on the overlap polling queue if the other parameter for either the new or existing input-output request has the first value, and
    ii) a process that enables a comparison of the addresses in the input-output requests it neither of the new and existing input-output requests has the first value of the other parameter.

6. A program as recited in claim 1 wherein said configuration module establishes the table by a process that defines the table with a predetermined capacity and a process that responds to the receipt of a new input-output request by enabling said testing module after determining the availability of an entry location in the table.

7. A program as recited in claim 6 wherein the storage device includes an available entry polling queue, said program additionally comprising an available entry polling process that interacts with the entries in the available entry polling queue to identify an available entry for the new input-output request.

8. A program as recited in claim 7 wherein said testing module includes a process that determines the availability of an entry in the table by an iterative sequence that tests the availability of an entry in the table over a predetermined interval prior to placing information about the new input-output request on the available entry polling queue.

9. A program as recited in claim 6 wherein each input-output request includes other parameters and wherein said testing module includes a process that compares each of the other parameters of the new input-output request with the corresponding parameters of the input-output requests in the table.

10. A program as recited in claim 9 wherein one parameter defines an input-output request that requires the entire logical volume to be dedicated to that input-output request, said testing module including:
   i) a process that terminates the program in response to a first value of the one parameter in an existing input-output request in the table, and
   ii) a process that places the input-output request on the overlap polling queue in response to a second value of the one parameter in the new input-output request.

11. A program as recited in claim 10 wherein an other parameter has a first value that defines an input-output request to be processed without interruption, said testing module including:
   i) a process that places the new input-output request on the overlap polling queue if the other parameter for either the new or existing input-output request has the first value, and
   ii) a process that enables the comparison of the addresses in the input-output requests if neither of the new and existing input-output requests has the first value of the other parameter.

12. A program as recited in claim 9 wherein an other parameter has a first value that defines an input-output request to be processed without interruption, said testing module including:
   i) a process that places the new input-output request on the overlap polling queue if the other parameter for either the new or existing input-output request has the first value, and
   ii) a process that enables the comparison of the addresses in the input-output requests if neither of the new and existing input-output requests has the first value of the other parameter.

13. A disk array storage facility enabled to handle overlapped input-output requests to a single logical volume wherein each input-output request contains a plurality of predetermined parameters including an address range and said storage facility includes an overlap polling queue, said disk array storage facility comprising:
   A) configuration means for establishing a table for the logical volume with entry input-output requests and corresponding parameters including the address range,
   B) testing means for testing the parameters for each new input-output request with respect to the parameters for input-output request entries in the table including the means for comparing of the address range in the new input-output request with the address range of each input-output request in the table to determine whether to place the new input-output request on the overlap polling queue, and
   C) polling means for responding to said testing by performing one of a plurality of control functions which control functions include enabling the processing of the input-output request by the storage facility including polling the entries on the overlap polling queue.

14. A disk array storage facility as recited in claim 13 wherein said polling means includes means for polling entries on the overlap polling queue to enable the new input-output request to be processed.

15. A disk array storage facility as recited in claim 13 wherein each input-output request includes other parameters and wherein said testing means includes means for comparing each of the other parameters of the new input-output request with the corresponding parameters of the input-output requests in the table.

16. A disk array storage facility as recited in claim 13 wherein one parameter defines an input-output request that requires the entire logical volume to be dedicated to that input-output request, said testing means including:
   i) means for terminating operations in response to a first value of the one parameter in an existing input-output request in the table, and
   ii) means for placing the input-output request on the overlap polling queue in response to a second value of the one parameter in the new input-output request.

17. A disk array storage facility as recited in claim 16 wherein an other parameter has a first value that defines an input-output request to be processed without interruption, said testing means including:
   i) means for placing the new input-output request on said overlap polling queue if the other parameter for either the new or existing input-output request has the first value, and
   ii) means for enabling the comparison of the addresses in the input-output requests if neither of the new and existing input-output requests has the first value of the other parameter.

18. A disk array storage facility as recited in claim 13 wherein said establishing means includes means for defining the table with a predetermined capacity and means for responding to the receipt of a new input-output request by enabling said testing means after determining the availability of an entry location in said table.

19. A disk array storage facility as recited in claim 18 wherein the storage device includes an available entry polling queue and available entry polling means for interacting with the entries in the available entry polling queue to identify an available entry for the new input-output request.

20. A disk array storage facility as recited in claim 19 wherein said testing means includes iterative processing means for iteratively testing the availability of an entry in the table over a predetermined interval prior to placing information about the new input-output request on said available entry polling queue.

21. A disk array storage facility as recited in claim 18 wherein each input-output request includes other parameters and wherein said testing means includes means for comparing each of the other parameters of the new input-output request with the corresponding parameters of the input-output requests in said table.

22. A disk array storage facility as recited in claim 21 wherein one parameter defines an input-output request that requires the entire logical volume to be dedicated to that input-output request, said testing means including means for terminating operations in response to a first value of the one parameter in an existing input-output request in the table and means for placing the input-output request on said overlap polling queue in response to a second value of the one parameter in the new input-output request.

23. A disk array storage facility as recited in claim 22 wherein an other parameter has a first value that defines an input-output request to be processed without interruption, said testing means including means for placing the new input-output request on the overlap polling queue if the other parameter for either the new or existing input-output request has the first value and means for enabling the comparison of the addresses in the input-output requests if neither of the new and existing input-output requests has the first value of the other parameter.

24. A disk array storage facility as recited in claim 21 wherein an other parameter has a first value that defines an input-output request to be processed without interruption, said testing means including means for placing the new input-output request on the overlap polling queue if the other parameter for either the new or existing input-output request has the first value and means for enabling the comparison of the addresses in the input-output requests if neither of the new and existing input-output requests has the first value of the other parameter.

* * * * *